US012681611B2

(12) United States Patent
Wang et al.

(10) Patent No.: US 12,681,611 B2
(45) Date of Patent: Jul. 14, 2026

(54) DISPLAY PANEL AND DISPLAY APPARATUS

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Yu Wang, Beijing (CN); Yang Zeng, Beijing (CN); Yi Zhang, Beijing (CN); Hongwei Ma, Beijing (CN); Zhiwen Chu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/868,039

(22) PCT Filed: Mar. 7, 2024

(86) PCT No.: PCT/CN2024/080567
§ 371 (c)(1),
(2) Date: Nov. 21, 2024

(87) PCT Pub. No.: WO2025/184867
PCT Pub. Date: Sep. 11, 2025

(65) Prior Publication Data
US 2026/0023454 A1 Jan. 22, 2026

(51) Int. Cl.
*G06F 3/044* (2006.01)

(52) U.S. Cl.
CPC .. *G06F 3/0446* (2019.05); *G06F 2203/04111* (2013.01)

(58) Field of Classification Search
CPC ..................... G06F 3/0446; G06F 2203/04111
See application file for complete search history.

(56) References Cited

U.S. PATENT DOCUMENTS

| | | | | |
|---|---|---|---|---|
| 2014/0347299 A1* | 11/2014 | Lu | .......................... | G06F 3/0446 |
| | | | | 345/173 |
| 2018/0039352 A1* | 2/2018 | Wu | .......................... | H10K 59/40 |
| 2018/0180952 A1* | 6/2018 | Park | .................. | G02F 1/133707 |
| 2021/0048925 A1* | 2/2021 | Wang | .................... | G06F 3/0446 |

* cited by examiner

*Primary Examiner* — Deeprose Subedi
(74) *Attorney, Agent, or Firm* — The Webb Law Firm

(57) ABSTRACT

A display panel includes a display substrate, first touch structures and second touch structures. A first touch structure includes first touch electrodes arranged in at least one column and first connection portions, and first touch electrodes in at least one column are connected through first connection portions. A second touch structure includes second touch electrodes arranged in at least one row and second connection portions, and second touch electrodes in at least one row are connected through second connection portions. An overlapping region where an orthographic projection of a second connection portion on the display substrate partially overlaps with an orthographic projection of a first connection portion on the display substrate is a bridge sub-region. A curvature radius of the display substrate is greater than or equal to 4.5 mm in a bridge sub-region that is in a curved region of the display substrate.

20 Claims, 18 Drawing Sheets

1000

1000

T12

T110

T110

T110

T110/T111

T121（T120）

T121 (T120)

T131（T130）

T132（T130）

T132（T130）

T132（T130）

DISPLAY PANEL AND DISPLAY APPARATUS

CROSS-REFERENCE TO RELATED APPLICATION

This application is the United States national phase of International Patent Application No. PCT/CN2024/080567, filed Mar. 7, 2024, the disclosure of which is hereby incorporated by reference in its entirety.

BACKGROUND OF THE INVENTION

Field of the Invention

The present disclosure relates to the field of display technologies, and in particular, to a display panel and a display apparatus.

Description of Related Art

With the rapid development of display technologies, display apparatuses have gradually become common in people's lives. Due to the advantages such as self-luminous, low power consumption, wide viewing angle, fast response speed, high contrast and flexible display, organic light-emitting diodes (OLEDs) are widely applied in smart products such as mobile phones, televisions, and notebook computers.

SUMMARY OF THE INVENTION

In an aspect, a display panel is provided. The display panel includes a display substrate, a plurality of first touch structures and a plurality of second touch structures. The display substrate has a light exit surface and a non-light exit surface. A display region of the display substrate has a curved region. The plurality of first touch structures are disposed on the light exit surface of the display substrate and extend in a first direction. A first touch structure includes a plurality of first touch electrodes and a plurality of first connection portions, the plurality of first touch electrodes are arranged in one or more columns, each column includes at least two first touch electrodes arranged at intervals in the first direction, and first touch electrodes in at least one column of the one or more columns are connected through first connection portions of the plurality of first connection portions.

The plurality of second touch structures are disposed on the light exit surface of the display substrate and extend in a second direction. The second direction intersects with the first direction. A second touch structure includes a plurality of second touch electrodes and a plurality of second connection portions; the plurality of second touch electrodes are arranged in one or more rows, each row includes at least two second touch electrodes arranged at intervals in the second direction, and second touch electrodes in at least one row of the one or more rows are connected through second connection portions of the plurality of second connection portions. The plurality of first touch electrodes and the plurality of second touch electrodes are disposed in a same layer, and the plurality of first touch electrodes are disposed in a same layer as the plurality of first connection portions or the plurality of second connection portions.

An overlapping region where an orthographic projection of a second connection portion of the plurality of second connection portions on the display substrate partially overlaps with an orthographic projection of a first connection portion of the plurality of first connection portions on the display substrate is a bridge sub-region; the plurality of first connection portions and the plurality of second connection portions define a plurality of bridge sub-regions, and at least one bridge sub-region of the plurality of bridge sub-regions is located in the curved region, and a curvature radius of the display substrate is greater than or equal to 4.5 mm in a bridge sub-region of the curved region.

In some embodiments, the display substrate includes a planar region and the curved region located on at least one side of the planar region. A region where a first touch structure overlaps with a second touch structure is a sensing region, and the plurality of first touch structures and the plurality of second touch structures define a plurality of sensing regions arranged in an array.

Sensing regions located at the outermost among the plurality of sensing regions are peripheral sensing regions, and other sensing regions among remaining sensing regions that are not adjacent to the peripheral sensing regions are central sensing regions. The central sensing regions are located in the planar region, and at least one peripheral sensing region overlaps with the curved region. A number of bridge sub-regions in peripheral sensing regions overlapping with the curved region is less than or equal to a number of bridge sub-regions in the central sensing regions.

In some embodiments, peripheral sensing regions located at corners are corner sensing regions, and a corner sensing region overlaps with the curved region. In the corner sensing region, a first touch electrode extends to a boundary of the corner sensing region in the first direction, and a second touch electrode is located on a side of the first touch electrode proximate to an adjacent peripheral sensing region in the second direction. Alternatively, in the corner sensing region, the second touch electrode extends to the boundary of the corner sensing region in the second direction, and the first touch electrode is located on at least one side of the second touch electrode in the first direction.

In some embodiments, the curved region is located at least on opposite sides of the planar region in the second direction. The curved region includes a first sub-curved region connected to the planar region, and in a direction perpendicular to a boundary of the planar region and from the planar region to the curved region, a curvature radius of the first sub-curved region of the display substrate decreases successively.

In the second direction, peripheral sensing regions located on opposite sides of the central sensing regions are first side sensing regions, and a first side sensing region overlaps with the first sub-curved region. The plurality of first touch electrodes of the first touch structure are arranged in at least two columns, and at least one column farthest from the central sensing regions is a first target column.

In the first side sensing region, first touch electrodes in at least one column except for the first target column are connected through first connection portions in the first direction. In the first direction, first touch electrodes in the first target column are separated by second touch electrodes; and in the second direction, the first touch electrodes in the first target column are connected to adjacent first touch electrodes.

In some embodiments, the first side sensing regions include a plurality of first sensing regions and a plurality of second sensing regions, and the plurality of second sensing regions are located on opposite sides of the plurality of first sensing regions in the first direction. In a first sensing region, first touch electrodes in each column except for the first target column are connected through first connection portions in the first direction, and first touch electrodes in different columns except for the first target column are separated by a second touch electrode in the second direction.

In some embodiments, the first side sensing regions include a plurality of first sensing regions and a plurality of second sensing regions, and the plurality of second sensing regions are located on opposite sides of the plurality of first sensing regions in the first direction. The plurality of first touch electrodes of the first touch structure are arranged in at least three columns, and a column adjacent to the first target column is a second target column.

In a second sensing region, first touch electrode in each column except for the first target column and the second target column are connected through first connection portions in the first direction, and first touch electrodes in different columns except for the first target column and the second target column are separated by a second touch electrode in the second direction.

Among first touch electrodes in the second target column, a first touch electrode farthest from a first sensing region is a first target touch electrode. The first target touch electrode and an adjacent first touch electrode in the first direction are separated by a second touch electrode, and the first target touch electrode is connected to an adjacent first touch electrode in the second direction. Alternatively, an end of the first target touch electrode extends in the first direction to a boundary of the second sensing region away from the plurality of first sensing regions, and another end of the first target touch electrode extends in the first direction to an adjacent first touch electrode.

In some embodiments, the curved region further includes a second sub-curved region, the second sub-curved region is located on a side of the first sub-curved region away from the planar region. In the direction perpendicular to the boundary of the planar region and from the planar region to the curved region, a curvature radius of the second sub-curved region of the display substrate increases successively.

In some embodiments, in the first direction, the curved region is located at least on opposite sides of the planar region. The curved region includes a third sub-curved region connected to the planar region, and in a direction perpendicular to a boundary of the planar region and from the planar region to the curved region, a curvature radius of the third sub-curved region of the display substrate decreases successively. In the first direction, peripheral sensing regions located on opposite sides of the central sensing regions are second side sensing regions, and a second side sensing region overlaps with the third sub-curved region.

In the second side sensing region, in the first direction, a distance between a boundary of the second side sensing region away from the central sensing regions and a nearest first connection portion is greater than a distance between a corresponding boundary of a central sensing region to a nearest first connection portion.

In some embodiments, the second side sensing regions include a plurality of third sensing regions and a plurality of fourth sensing regions, and the plurality of fourth sensing regions are located on opposite sides of the plurality of third sensing regions in the first direction. In a third sensing region, first touch electrodes in each column are connected through first connection portions in the first direction, and adjacent first touch electrodes in the second direction are separated by a second touch electrode.

In some embodiments, the second side sensing regions include a plurality of third sensing regions and a plurality of fourth sensing regions, and the plurality of fourth sensing regions are located on opposite sides of the plurality of third sensing regions in the first direction. The plurality of first touch electrodes of the first touch structure are arranged in at least three columns, and in a fourth sensing region, at least one column of first touch electrodes away from the plurality of third sensing regions is a third target column.

In the fourth sensing region, first touch electrodes in each column except for the third target column are connected through first connection portions in the first direction, and first touch electrodes in different columns except for the third target column are separated by a second touch electrode in the second direction.

Among first touch electrodes in the third target column, a first touch electrode farthest from the central sensing regions is a second target touch electrode. The second target touch electrode is separated from an adjacent first touch electrode by a second touch electrode in the first direction; and the second target touch electrode is connected to an adjacent first touch electrode in the second direction. Alternatively, an end of the second target touch electrode extends in the first direction to a boundary of the fourth sensing region away from the central sensing regions, and another end of the second target touch electrode extends in the first direction to an adjacent first touch electrode.

In some embodiments, peripheral sensing regions located at corners are a plurality of corner sensing regions; a corner sensing region among the plurality of corner sensing regions is a target corner sensing region, and a fourth sensing region adjacent to the target corner sensing region is a target fourth sensing region.

In the target corner sensing region, a second touch electrode extends to a boundary of the target corner sensing region in the second direction; and in the first direction, a first touch electrode is located on a side of the second touch electrode away from an adjacent peripheral sensing region and extends to the boundary of the target corner sensing region.

In the target fourth sensing region, a column of first touch electrodes proximate to the target corner sensing region is a fourth target column; among first touch electrodes in the fourth target column, a first touch electrode farthest from the central sensing regions is a third target touch electrode. In the first direction, the third target touch electrode is connected to an adjacent first touch electrode through a first connection portion; and in the second direction, the third target touch electrode is directly connected to a first touch electrode in the target corner sensing region.

In some embodiments, in the first direction, a sensing region adjacent to the target fourth sensing region is a fifth sensing region. In the fifth sensing region, a column of first touch electrodes farthest from the central sensing regions is a fifth target column. Among first touch electrodes in the fifth target column, a first touch electrode nearest to the target fourth sensing region is a fourth target touch electrode. In the first direction, the fourth target touch electrode is separated from an adjacent first touch electrode by a second touch electrode and is connected to the third target touch electrode. In the second direction, the fourth target touch electrode is directly connected to a first touch electrode of an adjacent peripheral sensing region.

In some embodiments, the third target touch electrode is connected to the fourth target touch electrode through at least two first connection portions.

In some embodiments, the curved region further includes a fourth sub-curved region, and the fourth sub-curved region is located on a side of the third sub-curved region away from the planar region. In the direction perpendicular to the boundary of the planar region and from the planar region to the curved region, a curvature radius of the fourth sub-curved region of the display substrate increases successively.

In some embodiments, in a central sensing region of the central sensing regions, first touch electrodes in each column are connected through first connection portions in the first direction, and adjacent first touch electrodes in the second direction are separated by a second touch electrode.

In some embodiments, in a same sensing region, an area of a first touch structure is equal to an area of a second touch structure.

In some embodiments, the display substrate includes a planar region and the curved region located on at least one side of the planar region. The curved region includes a fifth-sub curved region and a sixth-sub curved region that are connected in sequence, and the fifth-sub curved region is located between the sixth-sub curved region and the planar region. The sixth-sub curved region includes a first boundary, and the curvature radius of the display substrate is the smallest at the first boundary. In a direction perpendicular to the first boundary and from a boundary of the planar region to the first boundary, a curvature radius of the curved region decreases successively. Bridge sub-regions of the plurality of bridge sub-regions are located in the planar region and/or the fifth sub-curved region.

In some embodiments, a distance between a boundary of the fifth-sub curved region and the first boundary is greater than or equal to 0.3 mm.

In some embodiments, in a direction parallel to the planar region of the display substrate and perpendicular to the first boundary, a ratio of a distance between the first boundary and a boundary of the display substrate to a width of the curved region is in a range of 0 to 0.5, inclusive.

In some embodiments, the plurality of first touch electrodes of the first touch structure includes a plurality of first electrode patterns and a plurality of second electrode patterns, the plurality of first electrode patterns and the plurality of second electrode patterns are alternately arranged in the first direction, and a first electrode pattern is connected to a second electrode pattern through a first connection portion. The second electrode pattern includes an electrode body and an electrode branch, and the electrode branch is disposed on opposite sides of the electrode body in the second direction and connected to the electrode body.

In some embodiments, a region defined by boundaries of the first touch structures and the second touch structures is a touch region. The display panel further includes a first residual electrode pattern and a third connection portion. The first residual electrode pattern is a portion of a second electrode pattern of the first touch structure that still remains after an electrode branch and an electrode body of the second electrode pattern are cut off by a boundary of the touch region. The first residual electrode pattern is connected to an electrode body or a first electrode pattern of a corresponding first touch structure through the third connection portion.

In some embodiments, a region defined by boundaries of the first touch structures and the second touch structures is a touch region. The display panel further includes a second residual electrode pattern, and the second residual electrode pattern is a portion of the first touch structure that remains after being cut off by a boundary of the touch region. The second residual electrode pattern is connected to another adjacent first touch structure.

In another aspect, a display apparatus is provided. The display apparatus includes the display panel according to any of the above embodiments and a circuit board, and the circuit board is connected to the display panel.

BRIEF DESCRIPTION OF THE DRAWINGS

In order to describe the technical solutions in the present disclosure more clearly, accompanying drawings to be used in some embodiments of the present disclosure will be introduced briefly below. Obviously, the accompanying drawings to be described below are merely drawings of some embodiments of the present disclosure, and a person of ordinary skill in the art can obtain other drawings according to those drawings. In addition, the accompanying drawings to be described below may be regarded as schematic diagrams, and are not limitations on actual sizes of products, actual processes of methods and actual timings of signals that are involved in the embodiments of the present disclosure.

DESCRIPTION OF THE INVENTION

Figure 1:
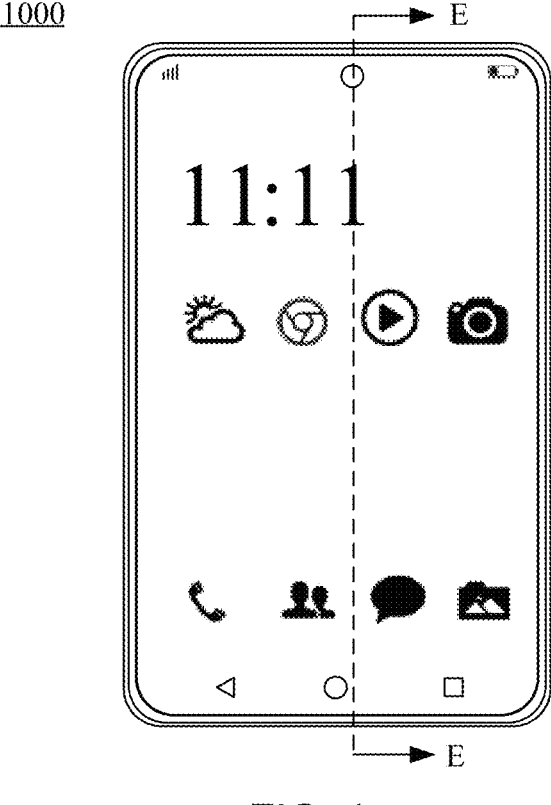
FIG. 1 is a structural diagram of a display apparatus, in accordance with some embodiments.

The technical solutions in some embodiments of the present disclosure will be described clearly and completely in conjunction with the accompanying drawings below. Obviously, the embodiments to be described are merely some but not all embodiments of the present disclosure. All other embodiments obtained by a person of ordinary skill in the art based on the embodiments of the present disclosure should be included in the protection scope of the present disclosure.

In the description of the present disclosure, orientations or positional relationships indicated by terms such as "center", "upper", "lower", "left", "right", "inner" and "outer" may be orientations or positional relationships shown in the drawings or based on sequential orders formed in process steps. These terms are merely to help to describe the present disclosure and simplify the description, but not to indicate or imply that the indicated devices or elements must have a particular orientation, or must be constructed or operated in a particular orientation. Therefore, these terms should not be construed as limitations on the present disclosure.

In the context of the present disclosure, the meanings of the terms "on", "above", and "over" should be interpreted in the broadest manner, so that the term "on" not only means "directly on something", but also includes the meaning of "on something" with intermediate features or layers therebetween, and the terms "above" or "over" not only means "above" or "over" something, but also includes the meaning of "above" or "over" something without intermediate features or layers therebetween (i.e., directly on something).

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, the term "connected" and derivatives thereof may be used. The term "connected" should be understood in a broad sense, for example, it may represent a mechanical connection or an electrical connection; it may represent a fixed connection, a detachable connection, or a one-piece connection; it may represent a direct connection, an indirect connection through an intermediate medium, or an internal communication between two elements. For a person of ordinary skill in the art, specific meanings of the above term in the present disclosure may be understood according to specific situations.

The phrase "at least one of A, B and C" has the same meaning as the phrase "at least one of A, B or C", both including the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein is meant to be an open and inclusive expression, which does not exclude devices that are applicable to or configured to perform additional tasks or steps.

As used herein, the term such as "about", "substantially" or "approximately" includes a stated value and an average value within an acceptable range of deviation of a particular value. The acceptable range of deviation is determined, for example, by a person of ordinary skill in the art, considering measurement in question and errors (i.e., limitations of a measurement system) associated with measurement of a particular quantity.

As used herein, the term such as "parallel" or "perpendicular" includes a stated condition and a condition similar to the stated condition, and the similar condition is within an acceptable range of deviation. The acceptable range of deviation is determined, for example, by a person of ordinary skill in the art, considering measurement in question and errors (i.e., limitations of a measurement system) associated with measurement of a specific quantity. For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°.

It should be understood that, in a case where a layer or element is referred to as being on another layer or substrate, it may be that the layer or element is directly on the another layer or substrate; or it may be that intermediate layer(s) exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a curved feature. Therefore, the regions shown in the accompanying drawings are schematic in nature, and their shapes are not intended to show actual shapes of regions in a device, and are not intended to limit the scope of the exemplary embodiments.

In this specification, unless otherwise defined, all terms (including technical and scientific terms) used herein have the same meanings as commonly understood by a person of ordinary skill in the art to which the present disclosure belongs. It will be further understood that, unless expressly defined herein, the terms (such as those defined in commonly used dictionaries) should be interpreted as having meanings consistent with their meanings in the background of the relevant art, and should not be interpreted as having ideal or overly formalized meanings.

The term "opposed to" means that a first element may be directly or indirectly opposed to a second element. In a case where a third element is disposed between the first element and the second element, the first element and the second element may be understood as being indirectly opposite to each other although still opposite to each other.

As shown in FIG. 1, some embodiments of the present disclosure provide a display apparatus 1000, and the display apparatus 1000 may be any apparatus that displays an image whether in motion (e.g., a video) or stationary (e.g., a static image), and whether textual or graphical.

For example, referring to FIG. 1, the display apparatus 1000 may be any product or component having a display function, such as a television, a notebook computer, a tablet computer, a mobile phone, a personal digital assistant (PDA), a navigator, a vehicle-mounted display, a flight display, a wearable device, or a virtual reality (VR) device.

Figure 2:
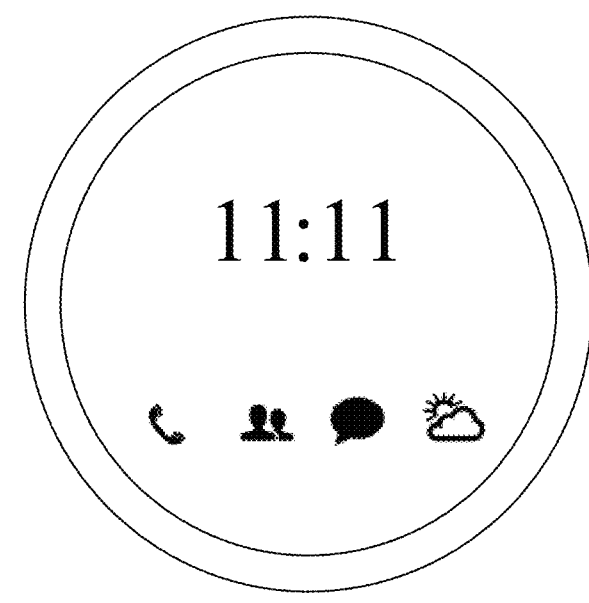
FIG. 2 is a structural diagram of another display apparatus, in accordance with some embodiments.

For example, as shown in FIG. 1, the display apparatus 1000 may be a portable display product; for example, the display apparatus 1000 may be the mobile phone shown in FIG. 1. For another example, referring to FIG. 2, the display apparatus 1000 may be a wearable device; for example, the display apparatus 1000 may be the watch shown in FIG. 2.

Figure 3:
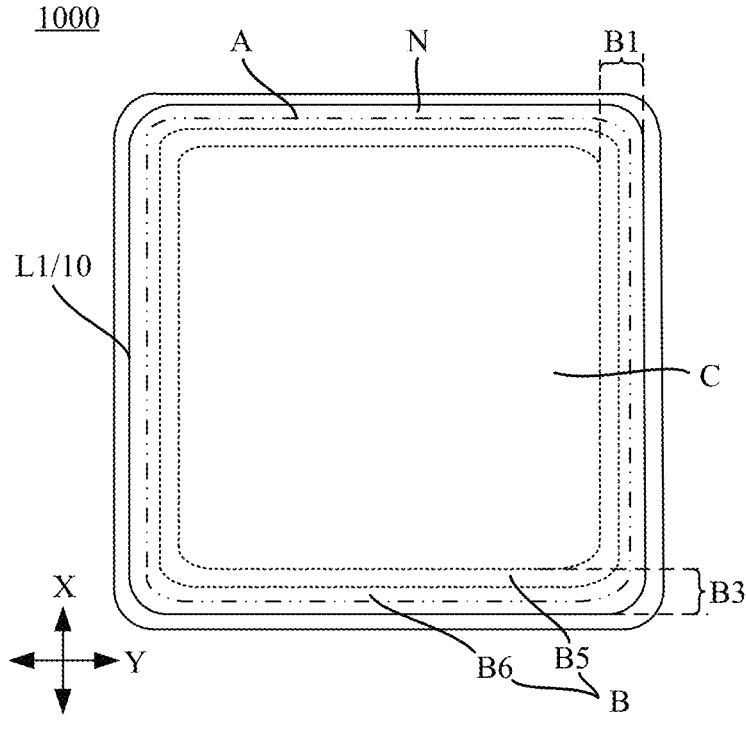
FIG. 3 is a structural diagram of yet another display apparatus, in accordance with some embodiments.
Figure 4:
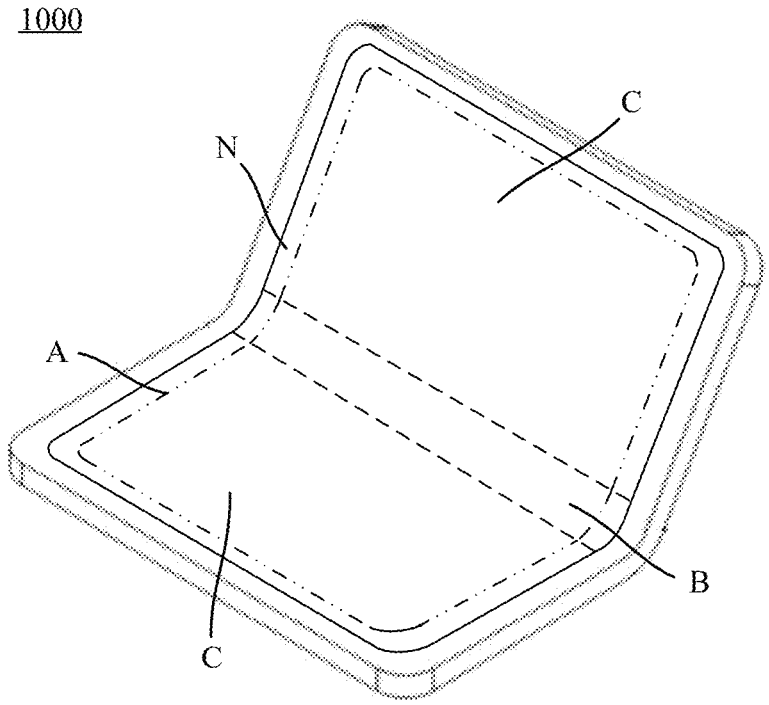
FIG. 4 is a structural diagram of still yet another display apparatus, in accordance with some embodiments.

According to different application scenarios, referring to FIGS. 3 and 4, the display apparatus 1000 may be any one of a curved display apparatus, a foldable display apparatus, or a rollable display apparatus. Furthermore, the display surface of the display apparatus 1000 may be substantially in a shape of any one of a circle, an ellipse, a polygon and an irregular shape, which is not specifically limited in the embodiments of the present disclosure.

Herein, the phrase "substantially in a shape of a circle or an ellipse" refers to in a shape of a circle or an ellipse as a whole, but is not limited to a standard circle or ellipse. That is, the "circle or ellipse" here includes not only a standard circle or ellipse, but also shapes similar to a circle or ellipse. For example, the "circle or ellipse" includes not only a curve with the same curvature everywhere, but also a smooth curve; that is, "circle or ellipse" may include a plurality of broken line segments that are connected end-to-end and approximately arc-shaped.

Herein, the phrase "substantially in a shape of a polygon" refers to in a shape of a polygon as a whole, but is not limited to a standard polygon. That is, the "polygon" here includes not only a standard polygon, but also shapes similar to a polygon. For example, two adjacent sides of a polygon are arc-shaped at an intersection (i.e., a corner); that is, "polygon" is a rounded polygon with smooth corners.

Figures 5, 6:
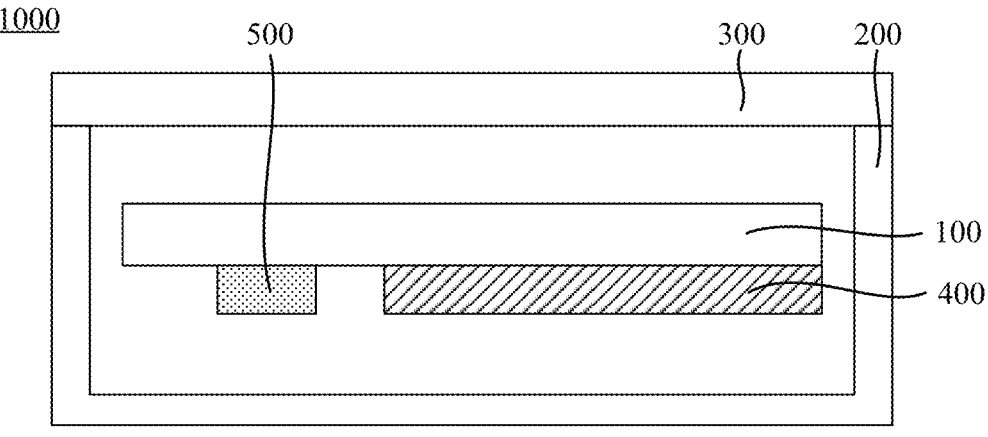
FIG. 5 is a sectional view of the display apparatus shown in FIG. 1 taken along the section line E-E.
FIG. 6 is a top view of a display panel, in accordance with some embodiments.

In some embodiments, referring to FIG. 5, the display apparatus 1000 includes a display panel 100, and the display panel 100 may include, for example, a display surface and a non-display surface that are opposite to each other. The display surface refers to a surface of the display panel 100 that displays images, and the non-display surface refers to the other surface opposite to the display surface.

There exist various types of display panels 100, which may be selected according to actual needs. For example, the display panel 100 may be an organic light-emitting diode (OLED) display panel, a quantum dot light-emitting diode (QLED) display panel, or a micro light-emitting diode (micro LED) display panel, which is not specifically limited in the embodiments of the present disclosure.

Some embodiments of the present disclosure are schematically illustrated below by taking an example in which the display panel 100 is an OLED display panel, and other display panels may also be taken into consideration as long as the same technical concept is applied.

In some embodiments, referring to FIG. 5, the display apparatus 1000 may further include a housing 200, a cover plate 300, a circuit board 400, a photosensitive device 500 and other electronic components. The display panel 100, the circuit board 400 and the photosensitive device 500 may be disposed in the housing 200.

For example, as shown in FIG. 5, the housing 200 may be of a box-shaped structure having an opening, the display panel 100, the circuit board 400 and the photosensitive device 500 may be disposed in the housing 200, and the cover plate 300 is disposed on the display surface of the display panel 100 and located at the opening of the housing 200.

The circuit board 400 may be bonded to the display panel 100 at an end of the display panel 100 and bent to a back surface of the display panel 100, so as to narrow the border of the display panel 100 to increase the screen-to-body ratio. The photosensitive device 500 may be integrated directly below the non-display surface of the display panel 100 to narrow the border of the display panel 100 and increase the screen-to-body ratio.

It will be noted that the photosensitive device 500 may be a camera, an infrared sensor, a proximity sensor, an eye tracking module, a face recognition module, or the like, which is not specifically limited in the embodiments of the present disclosure.

Figure 7:
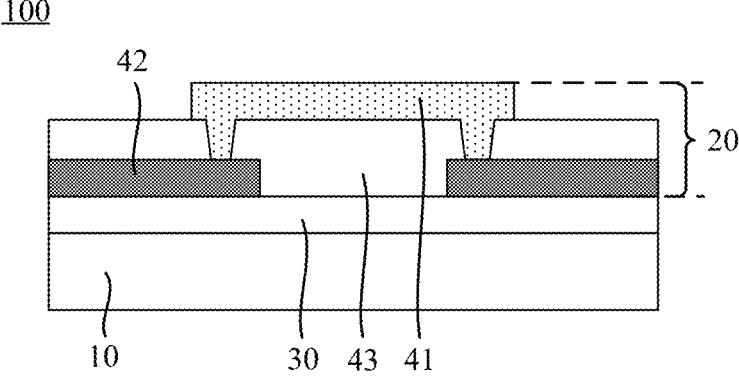
FIG. 7 is a sectional view of the display panel shown in FIG. 6 taken along the section line F-F.

In some embodiments, as shown in FIGS. 6 and 7, the display panel 100 includes a display substrate 10 and a touch layer 20.

The display substrate 10 has a light exit surface and a non-light exit surface that are opposite to each other. The light exit surface refers to a surface of the display substrate 10 proximate to the display surface of the display panel 100, and the non-light exit surface refers to the other surface of the display substrate 10 opposite to the light exit surface. The touch layer 20 is disposed on the light exit surface of the display substrate 10.

Here, referring to FIGS. 3 and 4, the display substrate 10 has a display region A and a peripheral region N disposed on at least one side of the display region A. The display region A is a region where images are displayed, and the display region A is configured to be provided with a plurality of sub-pixels therein. The peripheral region N is a region where no image is displayed, and the peripheral region N is configured to be provided therein with a display driving circuit and circuit wirings, such as the touch lead 50 (referring to FIG. 8) mentioned below.

The plurality of sub-pixels may be arranged in multiple rows and multiple columns in the display region A. The multiple columns include at least two sub-pixels arranged in a first direction X, and the multiple rows include at least two sub-pixels arranged in a second direction Y. For example, each column includes at least two sub-pixels arranged in the first direction X, and each row includes at least two sub-pixels arranged in the second direction Y. The first direction X intersects with the second direction Y; for example, the first direction X is perpendicular to the second direction Y.

Some embodiments of the present disclosure will be schematically described below by taking an example in which the first direction X is perpendicular to the second direction Y, but the embodiments of the present disclosure are not limited thereto, and it may also be taken into consideration that the included angle between the first direction X and the second direction Y is 70°, 80°, 85° or other angles, as long as the same technical concept is applied.

In some embodiments, referring to FIG. 7, the display panel 100 further includes an encapsulation layer 30, and the encapsulation layer 30 is disposed on the light exit surface of the display substrate 10 to reduce the risk of water and oxygen corrosion. The encapsulation layer 30 may be an encapsulation film or an encapsulation substrate.

In this case, the touch layer 20 may be disposed on a side of the encapsulation layer 30 away from the display substrate 10. For example, the touch layer 20 may be directly formed on the side of the encapsulation layer 30 away from the display substrate 10 by a semiconductor process; that is, there are no other film layers between the touch layer 20 and the encapsulation layer 30, which is conducive to the thinness and lightness of the display panel 100.

It will be noted that, the touch layer 20 may be disposed between the encapsulation layer 30 and the display substrate 10, which is not specifically limited in the embodiments of the present disclosure.

In some embodiments, as shown in FIG. 6, the touch layer 20 includes a plurality of first touch structure 21 and a plurality of second touch structure 22. The first touch structure 21 extends in the first direction X, and the second touch structure 22 extends in the second direction Y.

The first touch structure 21 and the second touch structure 22 are insulated from each other, so that a capacitive node may be formed between a first touch electrode 210 and a second touch electrode 220. A region defined by the boundaries of the first touch structures 21 and the second touch structures 22 is a touch region T.

In this case, a pulsed or alternating voltage applied to the first touch structures 21 by a touch chip in a circuit board 400 may induce charges on the second touch structures 22, and the amount of the induced charges is susceptible to external influences (e.g., touch or proximity of a finger). That is, when a finger touches or approaches a capacitive node, the capacitance of the capacitive node will change, and the touch chip in the circuit board 400 (referring to FIG. 5) may measure the capacitance change through the second touch structures 22, so as to determine the position in the touch region T that the finger touches or approaches based on the capacitance change of the entire touch layer 20.

It will be understood that, in order to insulate the first touch structures 21 and the second touch structures 22 from each other, a "bridge" design is applied at the intersections of the first touch structures 21 and the second touch structures 22.

For example, as shown in FIG. 6, the first touch structure 21 includes a plurality of first touch electrodes 210 and a plurality of first connection portions 201. The plurality of first touch electrodes 210 are arranged in at least one column, each column includes at least two first touch electrodes 210 arranged at intervals in the first direction X, and the at least one column of the first touch electrodes 210 are connected through the first connection portions 201.

Furthermore, the second touch structure 22 includes a plurality of second touch electrodes 220 and a plurality of second connection portions 202. The plurality of second touch electrodes 220 are arranged in at least one row, each row includes at least two second touch electrodes 220 arranged at intervals in the second direction Y, and the at least one row of the second touch electrodes 220 are connected through the second connection portions 202.

Based on this, an orthographic projection of the first connection portion 201 on the display substrate 10 partially overlaps with an orthographic projection of the second connection portion 202 on the display substrate 10, and the first connection portion 201 and the second connection portion 202 are disposed in different layers. A region where the first connection portion 201 overlaps with the second connection portion 202 is a bridge sub-region S. That is, the first touch electrodes 210 and the second touch electrodes 220 are disposed in a same layer, and the first touch electrodes 210 are disposed in the same layer as the first connection portions 201 or the second connection portions 202. The following is schematically described by taking an example in which the first touch electrodes 210 are disposed in the same layer as the first connection portions 201, but the embodiments of the present disclosure are not limited thereto.

Here, the first touch electrodes 210, the second touch electrodes 220, the first connection portions 201 and the second connection portions 202 may all be of a grid structure, and the mesh in the grid structure exposes at least one sub-pixel to prevent the first touch electrodes 210, the second touch electrodes 220, the first connection portions 201 and the second connection portions 202 from blocking the light output by the sub-pixels. In addition, a dummy electrode D (referring to FIG. 9) may be provided between a first touch electrode 210 and a second touch electrode 220 that are disposed in a same layer. The dummy electrodes D (referring to FIG. 9) may also be of a grid structure, and the mesh in the grid structure exposes at least one sub-pixel to prevent the dummy electrodes D from blocking the light output by the sub-pixels. The grid structures formed from the dummy electrodes D, the first touch structures 21 and the second touch structures 22 are evenly distributed, which is conducive to improving the brightness uniformity of the display panel 100.

In some embodiments, as shown in FIG. 7, the touch layer 20 includes a first conductive layer 41, a second conductive layer 42 and an insulation layer 43 located between the first conductive layer 41 and the second conductive layer 42.

For example, as shown in FIGS. 6 and 7, the first conductive layer 41 is further away from the display substrate 10 than the second conductive layer 42. The first touch electrodes 210, the second touch electrodes 220 and the first connection portions 201 may be disposed in the second conductive layer 42, and the second connection portions 202 are disposed in the first conductive layer 41. The insulation layer 43 is provided with a plurality of via holes therein, and the second connection portions 202 are connected to the second touch electrodes 202 through the via holes.

However, in a curved display apparatus, a foldable display apparatus, or a rollable display apparatus, the bridges in the related art are evenly distributed, and a part of the bridges are located at a position of the display panel where the curvature radius is relatively small, which results in relatively great stress concentration on the bridges. As a result, the display panel has a relatively great risk of cracks or breakage at the positions of the bridges, and the product yield is low.

Figure 8:
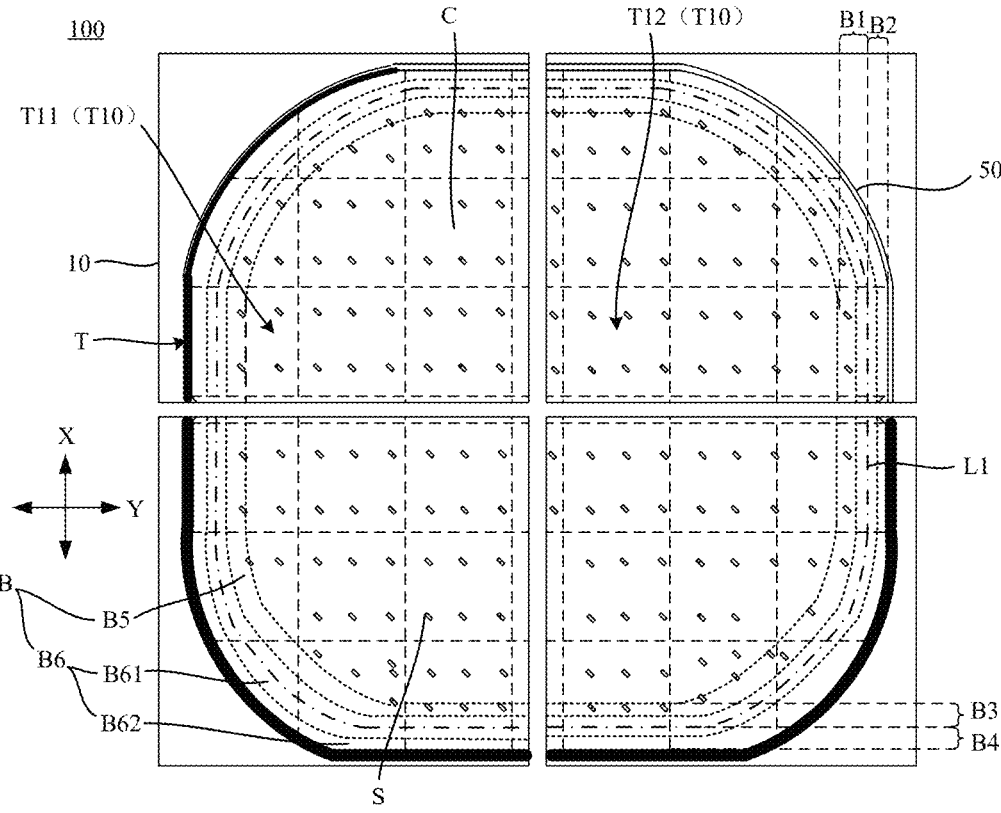
FIG. 8 is a top view of another display panel, in accordance with some embodiments.

Based on this, in the display panel 100 provided in some embodiments of the present disclosure, referring to FIGS. 3 and 8, the display region A of the display substrate 10 has a curved region B. Here, the display region A having the curved region B may mean that a portion of the curved region B is located in the display region A, and another portion of the curved region B is located in the peripheral region N. Of course, it may also mean that the curved region B is completely located in the display region A, and the present disclosure does not specifically limit thereto.

The curved region B includes a curved region of the display substrate 10 and a region of the display substrate 10 that can be bent or rolled. That is, in a case where the display apparatus 1000 is a foldable display apparatus or a rollable display apparatus, the curved region B includes a region of the display substrate 10 that can be folded or rolled; in a case where the display apparatus 1000 is a curved display apparatus, the curved region B includes a curved region of the display substrate 10.

Figure 9:
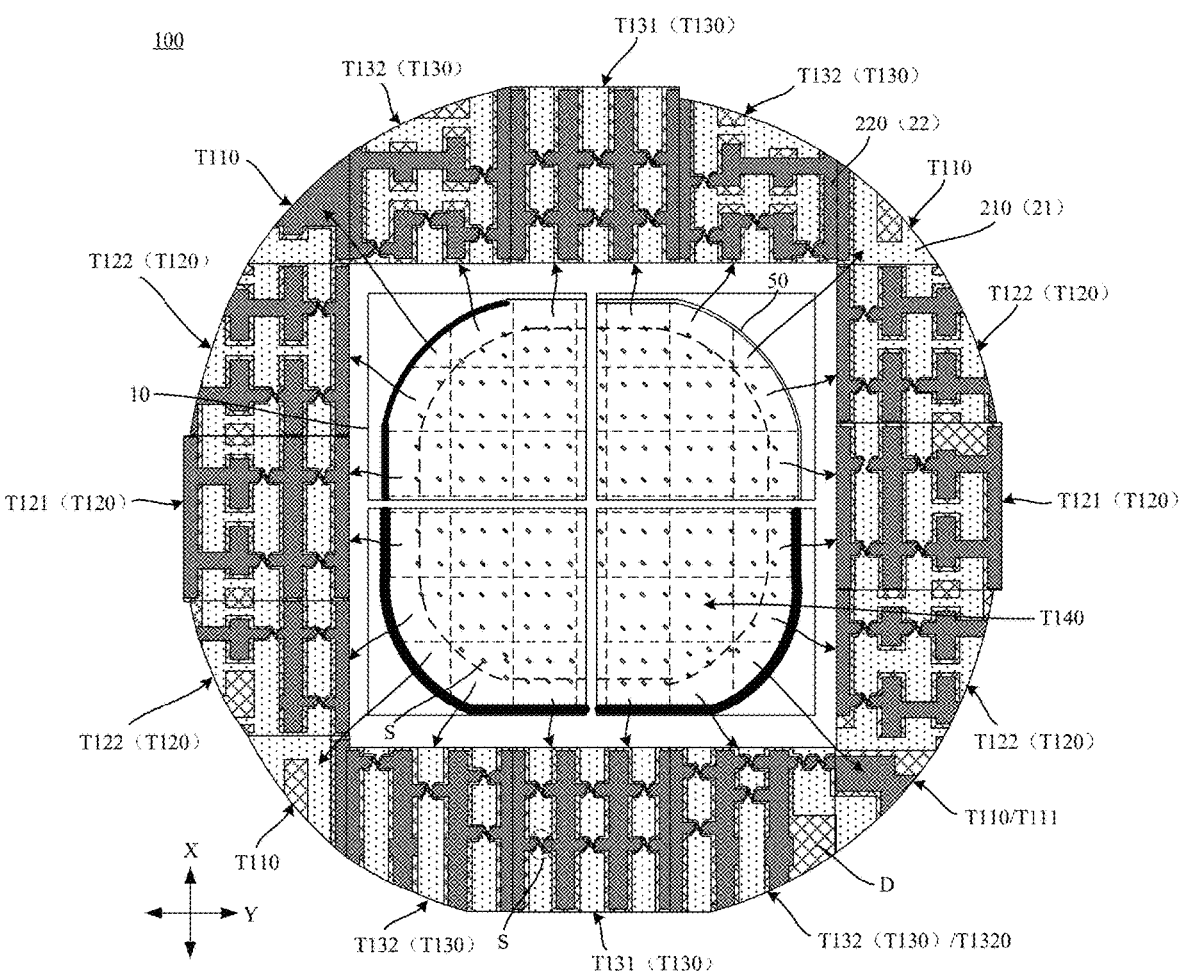
FIG. 9 is a partial enlarged view of a peripheral sensing region of the display panel shown in FIG. 8.

Based on this, referring to FIGS. 8 and 9, at least one bridge sub-region S is located in the curved region B, and in the bridge sub-region S in the curved region B, the curvature radius of the display substrate 10 is greater than or equal to 4.5 mm. Based on this, in a case where the position of the bridge sub-region S is located in the curved region B of the display substrate 10, the bridge sub-region S is disposed in a region with a relatively large curvature radius (the curvature radius is greater than or equal to 4.5 mm) and avoids the region with a relatively small curvature radius (e.g., the curvature radius is less than 4.5 mm), thereby alleviating the stress concentration in the bridge sub-region S, reducing the risk of cracks or breakage of the display panel 100 in the bridge sub-region S, so as to improve the production yield of the display panel 100.

Some embodiments of the present disclosure will be schematically described below by taking an example in which the display apparatus 1000 is a curved display apparatus, but the embodiments of the present disclosure are not limited thereto, and other display apparatuses may also be taken into consideration as long as the same technical concept is applied.

In some embodiments, referring to FIG. 8, the display substrate 10 includes a planar region C and a curved region B located on at least one side of the planar region C.

As shown in FIGS. 8 and 9, a region where a first touch structure 21 intersects with a second touch structure 22 is a sensing region T10, and the plurality of first touch structures 21 and the plurality of second touch structures 22 define a plurality of sensing regions T10 arranged in an array; that is, the touch region T includes a plurality of sensing regions T10 arranged in an array. Furthermore, in a same sensing region T10, the areas of the first touch structure 21 and the second touch structure 22 may, for example, be substantially equal to improve touch sensitivity.

Based on this, as shown in FIG. 8, the sensing regions T10 located at the outermost among the plurality of sensing regions T10 are peripheral sensing regions T11, and other sensing regions T10 among the remaining sensing regions T10 that are not adjacent to the peripheral sensing regions T11 are central sensing regions T12. The central sensing regions T12 are located in the planar region C, and at least one peripheral sensing region T11 overlaps with the curved region B. The number of bridge sub-regions S in the peripheral sensing region T11 that overlaps with the curved region B is less than or equal to the number of bridge sub-regions S in the central sensing regions T12.

That is, in comparison with the central sensing region T12 located in the planar region C, the number of bridge sub-regions S in the peripheral sensing region T11 that overlaps with the curved region B is reduced, thereby reducing the number of bridge sub-regions S in the curved region B, and reducing the risk of cracks or breakage of the display panel 100 in the bridge sub-regions S of the curved region B, so as to improve the production yield of the display panel 100.

In some examples, referring to FIGS. 3 and 8, the display substrate 10 includes a planar region C and a curved region B located on at least one side of the planar region C. FIGS. 3 and 8 are illustrated by taking an example in which the peripheral region B surrounds the planar region C.

The curved region B includes a fifth sub-curved region B5 and a sixth sub-curved region B6 that are connected in sequence, and the fifth sub-curved region B5 is located between the sixth sub-curved region B6 and the planar region C. The sixth sub-curved region B6 includes a first boundary L1, and the curvature radius of the display substrate 10 at the first boundary L1 is the smallest. For example, the curvature radius of the display substrate 10 at the first boundary L1 is 4 mm.

Some embodiments of the present disclosure will be schematically described below by taking an example in which the curved region B surrounds the planar region C, but the embodiments of the present disclosure are not limited thereto, and it may also be taken into consideration that the curved region B is located on opposite sides of the planar region C in the first direction X or in the second direction Y, as long as the same technical concept is applied.

In some embodiments, in a direction perpendicular to the first boundary L1 and from a boundary of the planar region C to the first boundary L1, the curvature radius of the curved region B decreases successively. Herein, the phrase "decrease successively" includes a gradual decrease in a gradual manner; that is, the change in the curvature radius is continuous. For example, in the direction perpendicular to the first boundary L1 and from the boundary of the planar region C to the first boundary L1, the curvature radius and a distance between the boundary of the planar region C and the first boundary L1 are in a linear relationship. Alternatively, the phrase "decrease successively" may include a decrease stepwise; that is, the change in the curvature radius may have a constant stage and a sudden change stage.

In this case, the bridge sub-region S may be located in the planar region C and/or the fifth sub-curved region B5. In this case, the bridge sub-region S may avoid the region with a relatively small curvature radius; that is, the curvature radius of the position where the bridge sub-region S is located is relatively great, so that the risk of cracks or breakage of the display panel 100 in the bridge sub-regions S may be reduced to improve the production yield of the display panel 100.

For example, referring to FIGS. 3 and 8, a distance between a boundary of the fifth sub-curved region B5 and the first boundary L1 is greater than or equal to 0.3 mm. For example, the distance between the boundary of the fifth sub-curved region B5 and the first boundary line L1 is 0.3 mm, so that the curvature radius of the fifth sub-curved region B5 is relatively great; for example, the curvature radius of the fifth sub-curved region B5 is greater than or equal to 4.5 mm. Thus, the bridge sub-region S may be located at any position in the fifth sub-curved region B5, and the stress concentration of the bridge sub-region S in the fifth sub-curved region B5 is relatively small, so that the risk of cracks or breakage of the display panel 100 in the bridge sub-region S of the fifth sub-curved region B5 is relatively small.

In addition, referring to FIGS. 3 and 8, in a direction parallel to the planar region C of the display substrate 10 and perpendicular to the first boundary L1, a ratio of a distance between the first boundary L1 and a boundary of the display substrate 10 to a width of the curved region B is in a range of 0 to 0.5, inclusive.

For example, in the direction parallel to the planar region C of the display substrate 10 and perpendicular to the first boundary L1, the ratio of the distance between the first boundary L1 and the boundary of the display substrate 10 to the width of the curved region B is any one of 0, 0.1, 0.2, 0.3, 0.4 and 0.5.

For example, as shown in FIG. 3, the first boundary L1 substantially coincides with the boundary of the display substrate 10. That is, the distance between the first boundary L1 and the boundary of the display substrate 10 is 0; that is, the ratio of the distance between the first boundary L1 and the boundary of the display substrate 10 to the width of the curved region B is 0; that is, the first boundary L1 substantially coincides with the boundary of the display substrate 10.

For another example, as shown in FIG. 8, the distance between the first boundary L1 and the boundary of the display substrate 10 is 1.3 mm, and the width of the curved region B is 3.1 mm. That is, the ratio of the distance between the first boundary L1 and the boundary of the display substrate 10 to the width of the curved region B is approximately 0.4.

In some embodiments, referring to FIG. 8, the sixth sub-curved region B6 may include a first region B61 and a second region B62, and the first region B61 is located between the second region B62 and the fifth sub-curved region B5. Furthermore, the first boundary L1 is located in the first region B61.

In a direction perpendicular to the first boundary L1 and from the first boundary L1 to a boundary of the sixth sub-curved region B6 away from the fifth sub-curved region B5, the curvature radius of the curved region B increases successively. Herein, the phrase "increase successively" includes a gradual increase in a gradual manner; that is, the change in the curvature radius is continuous. For example, in the direction perpendicular to the first boundary L1 and from the boundary of the planar region C to the first boundary L1, the curvature radius and the distance between the boundary of the planar region C and the first boundary L1 are in a linear relationship. Alternatively, the phrase "increase successively" may include an increase stepwise; that is, the change in the curvature radius may have a constant stage and a sudden change stage.

Based on this, a distance between a boundary of the second region B62 proximate to the first region B61 and the first boundary L1 is greater than or equal to 0.3 mm. For example, the distance between the boundary of the second region B62 proximate to the first region B61 and the first boundary line L1 is 0.3 mm, so that the curvature radius of the second region B62 is relatively great; for example, the curvature radius of the second region B62 is greater than or equal to 4.5 mm. In this case, the bridge sub-region S may also be located at any position in the second region B62, and the stress concentration of the bridge sub-region S in the second region B62 is relatively small, so that the risk of cracks or breakage of the display panel 100 in the bridge sub-region S of the second region B62 is relatively small.

Figure 10:
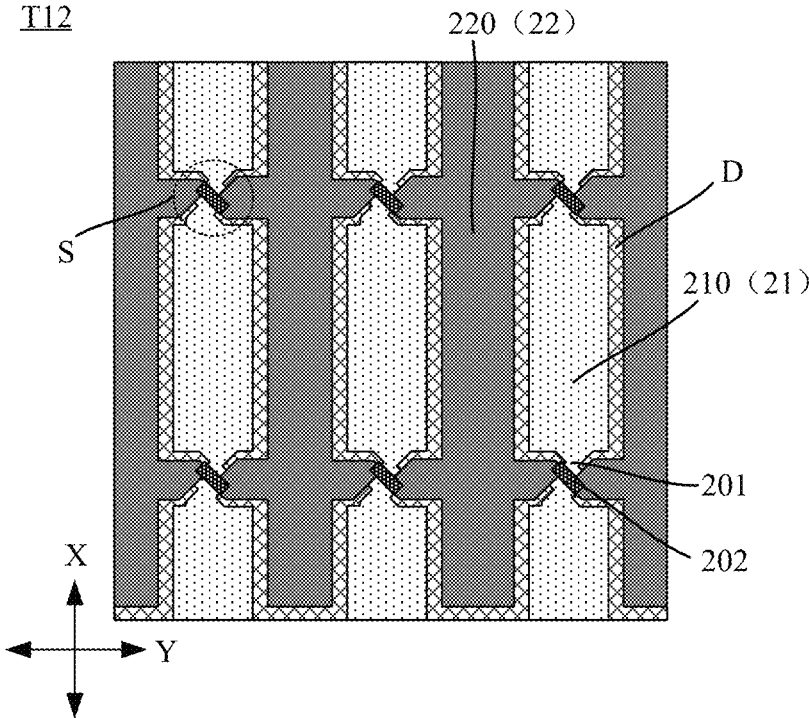
FIG. 10 is a partial enlarged view of a central sensing region of a display panel, in accordance with some embodiments.
Figure 10:

In some embodiments, referring to FIGS. 8 and 10, in a central sensing region T12, the first touch electrodes 210 in each column are connected through the first connection portions 201 in the first direction X, and adjacent first touch electrodes 210 in the second direction Y are separated by the second touch electrode 220. That is, in the central sensing region T12, in the first direction X, a bridge sub-region S exists between every two adjacent first touch electrodes 210.

In some embodiments, referring to FIGS. 8 and 9, peripheral sensing region T11 located at the corners are corner sensing regions T110, and the corner sensing region T110 overlaps with the curved region B.

Figure 11:
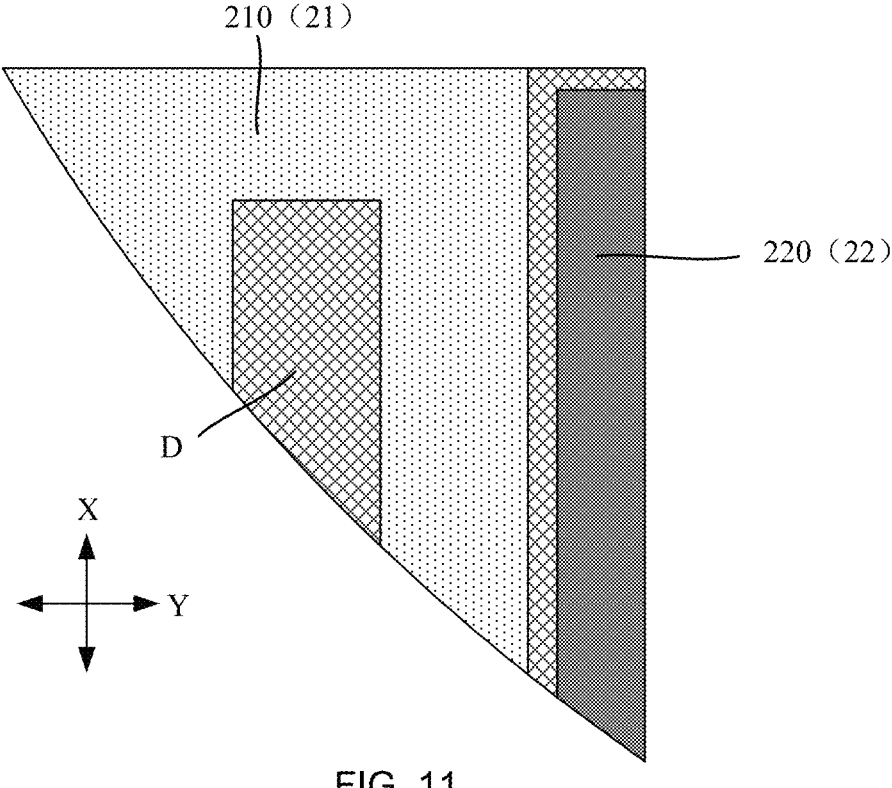
FIG. 11 is a partial enlarged view of a corner sensing region of a display panel, in accordance with some embodiments.
Figure 12:
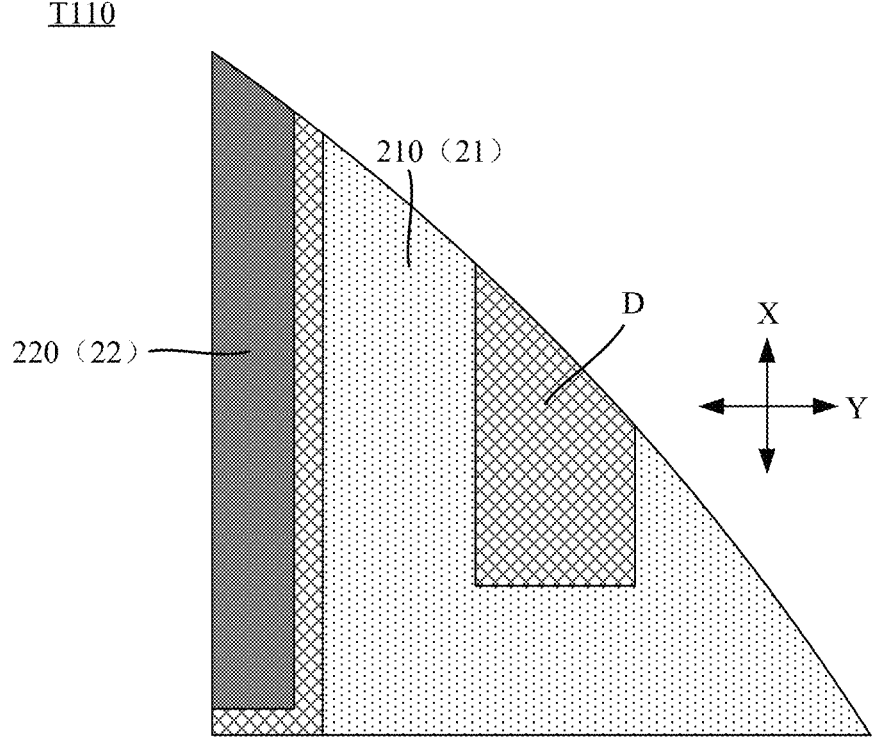
FIG. 12 is a partial enlarged view of another corner sensing region of a display panel, in accordance with some embodiments.

In some examples, as shown in FIGS. 9, 11 and 12, in a corner sensing region T110, a first touch electrode 210 extends to a boundary of the corner sensing region T110 in the first direction X. Moreover, a second touch electrode 220 is located on a side of the first touch electrode 210 proximate to an adjacent peripheral sensing region T11 in the second direction Y.

In this case, no bridge sub-region S exists in the corner sensing region T110, which may reduce the risk of cracks or breakage of the display panel 100 in the corner sensing region T110. Moreover, in the corner sensing region T110, the first touch electrode 210 and the second touch electrode 220 may be respectively connected to a first touch electrode 210 and a second touch electrode 220 in an adjacent peripheral sensing region T11, so as to increase the area of the touch region T to improve the touch sensitivity of the display panel 100 at the corners. Meanwhile, a first touch structure 21 to which the first touch electrode 210 belongs may be led out from a side of the display substrate 10 in the first direction X and connected to a corresponding touch lead 50.

Figure 13:
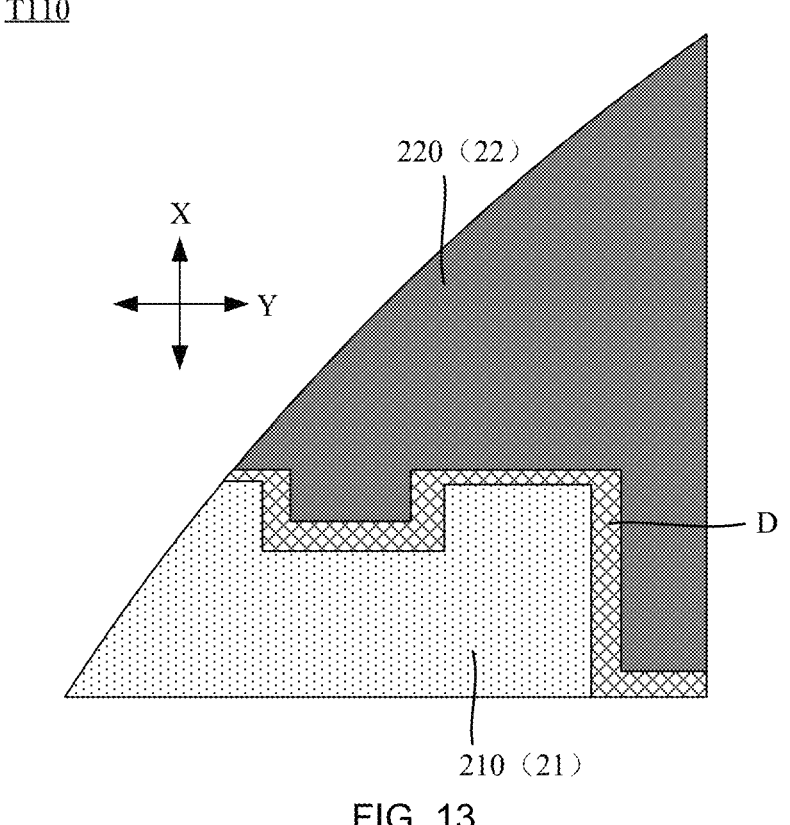
FIG. 13 is a partial enlarged view of yet another corner sensing region of a display panel, in accordance with some embodiments.
Figure 14:
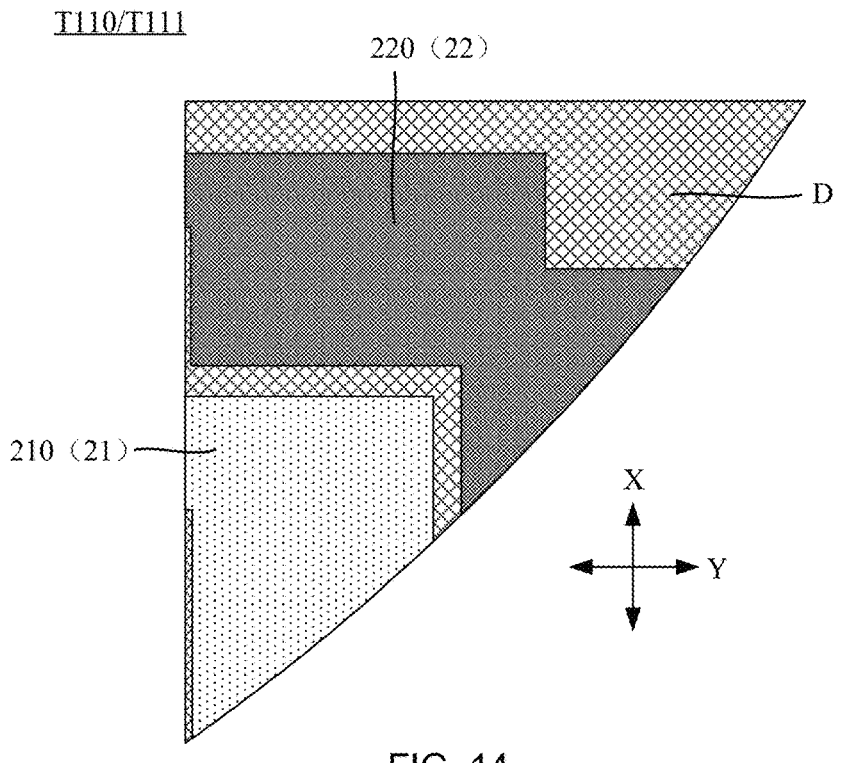
FIG. 14 is a partial enlarged view of still yet another corner sensing region of a display panel, in accordance with some embodiments.

In some other examples, as shown in FIGS. 9, 13 and 14, in a corner sensing region T110, in the second direction Y, a second touch electrode 220 extends to a boundary of the corner sensing region T110. Furthermore, in the first direction X, a first touch electrode 210 is located on at least a side of the second touch electrode 220.

For example, as shown in FIGS. 9 and 13, in the first direction X, the first touch electrode 210 is located on a side of the second touch electrode 220 proximate to an adjacent peripheral sensing region T11. For another example, as shown in FIGS. 9 and 14, in the first direction X, the first touch electrode 210 is located on a side of the second touch electrode 220 away from the adjacent peripheral sensing region T11.

In this case, no bridge sub-regions S exists in the corner sensing region T110, which may reduce the risk of cracks or breakage of the display panel 100 in the corner sensing region T110. Moreover, in the corner sensing region T110, the first touch electrode 210 and the second touch electrode 220 may be respectively connected to a first touch electrode 210 and a second touch electrode 220 in an adjacent peripheral sensing region T11, so as to increase the area of the touch region T to improve the touch sensitivity of the display panel 100 at the corners. Meanwhile, a second touch structure 22 to which the second touch electrode 220 belongs may be led out from a side of the display substrate 10 in the second direction Y and connected to a corresponding touch lead 50.

In some embodiments, referring to FIGS. 3 and 8, the curved region B is located at least on opposite sides of the planar region C in the second direction Y. The curved region B includes a first sub-curved region B1 connected to the planar region C. In a direction perpendicular to a boundary of the planar region C and from the planar region C to the curved region B, the curvature radius of the first sub-curved region B1 of the display substrate 10 decreases successively.

For example, as shown in FIG. 8, the curved region B may further include a second sub-curved region B2, and the second sub-curved region B2 is located on a side of the first sub-curved region B1 away from the planar region C. In the direction perpendicular to the boundary of the planar region C and from the planar region C to the curved region B, the curvature radius of the second sub-curved region B2 of the display substrate 10 increases successively.

It will be noted that, the boundary between the first sub-curved region B1 and the second sub-curved region B2 may be the above-mentioned first boundary L1.

Based on this, as shown in FIGS. 8 and 9, in the second direction Y, the peripheral sensing regions T11 located on opposite sides of the central sensing regions T12 are first side sensing regions T120, and the first side sensing region T120 overlaps with the first sub-curved region B1. Furthermore, referring to FIGS. 15 to 20, the plurality of first touch electrodes 210 of the first touch structure 21 are arranged in at least two columns, and at least one column farthest from the central sensing regions T12 is a first target column M1.

Some embodiments of the present disclosure will be schematically described below by taking an example in which a column farthest from the central sensing regions T12 is the first target column M1, but the embodiments of the present disclosure are not limited thereto, and it may also be taken into consideration that there are 2 or 3 first target columns M1, as long as the same technical concept is applied.

Referring to FIG. 9 and FIGS. 15 to 20, in a first side sensing region T120, in the first direction X, the first touch electrodes 210 in at least one column except for the first target column M1 are connected through the first connection portions 201 to receive and transmit a touch signal. In the first direction X, the first touch electrodes 210 in the first target column M1 are separated by the second touch electrodes 220. Furthermore, in the second direction Y, the first touch electrodes 210 in the first target column M1 are connected to adjacent first touch electrodes 210 to receive a touch signal and achieve a touch sensing function.

Figure 15:
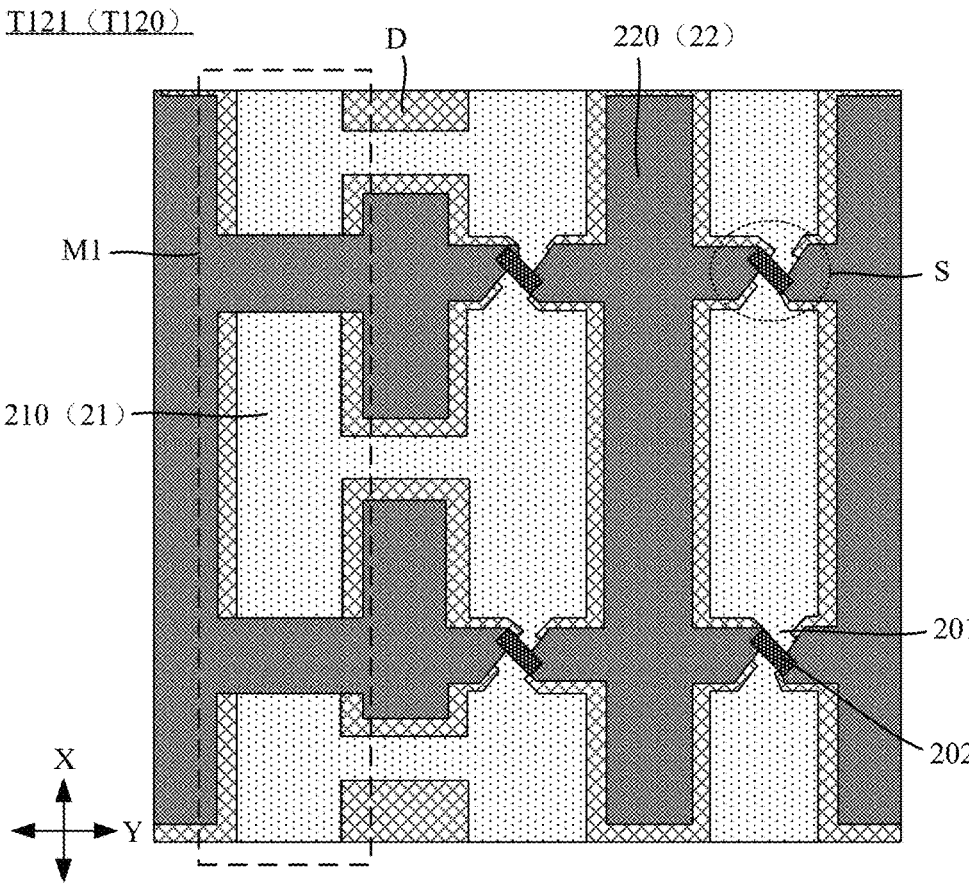
FIG. 15 is a partial enlarged view of a first sensing region of a display panel, in accordance with some embodiments.
Figure 16:
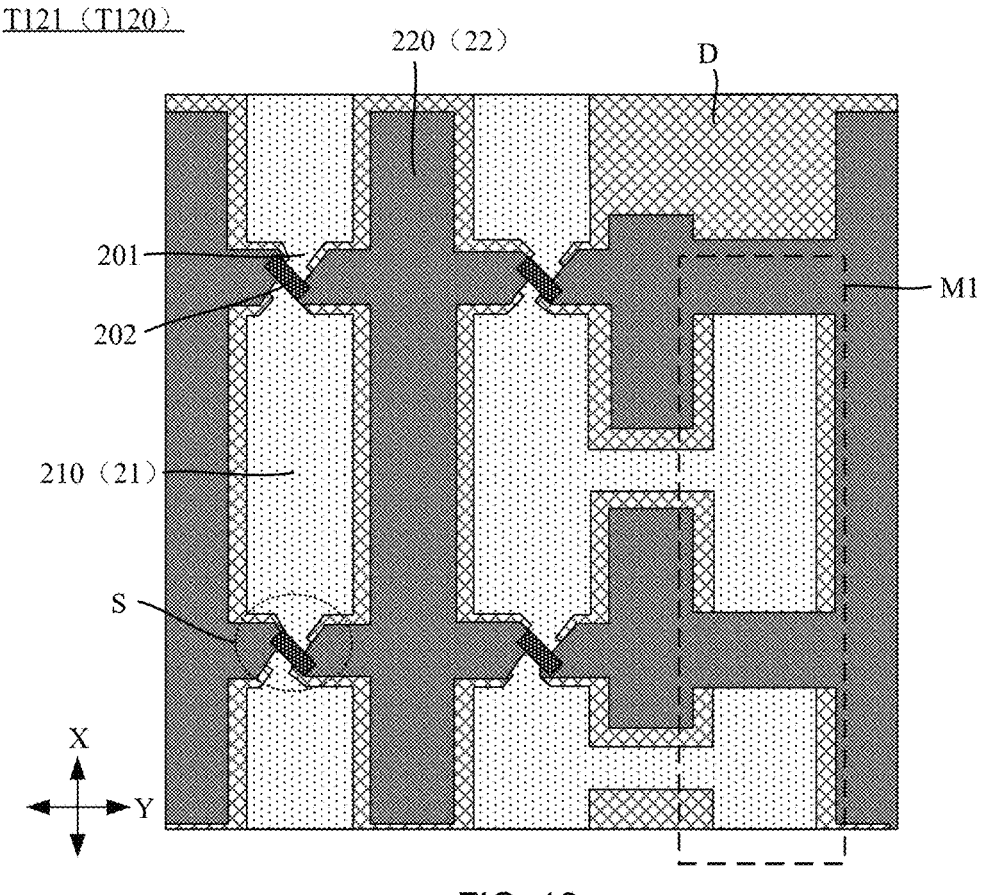
FIG. 16 is a partial enlarged view of another first sensing region of a display panel, in accordance with some embodiments.

It will be noted that, as shown in FIG. 15, in the second direction Y, a dummy electrode D may be provided between adjacent first touch electrodes 210; as shown in FIG. 16, in the first direction X, in the first target column M1, a dummy electrode D may be provided between adjacent first touch electrodes 210, so as to balance the areas of the first touch structures 21 and the second touch structures 22 in a same first side sensing region T120.

In this case, there is no first connection portion 201 between the first touch electrodes 210 in the first target column M1, which reduces the number of bridge sub-regions S in the first sub-curved region B1, and reduces the risk of cracks or breakage of the display panel 100 in the first sub-curved region B1. Furthermore, in the first side sensing region T120, there is no bridge sub-region S in a region with a relatively small curvature radius, which further reduces the risk of cracks or breakage of the display panel 100 in the bridge sub-regions S of the first sub-curved region B1. As a result, the production yield of the display panel 100 is improved.

For example, referring to FIG. 9, the first side sensing regions T120 include a plurality of first sensing regions T121 and a plurality of second sensing regions T122. In the first direction X, the plurality of second sensing regions T122 are arranged on opposite sides of the plurality of first sensing regions T121.

As shown in FIGS. 15 and 16, in a first sensing region T121, in the first direction X, the first touch electrodes 210 in each column except for the first target column M1 are connected through the first connection portions 201. In the second direction Y, the first touch electrodes 210 in different columns except for the first target column M1 are separated by the second touch electrode 220. FIGS. 15 and 16 are illustrated by taking an example in which the plurality of first touch electrodes 210 of the first touch structure 21 are arranged in three columns.

In addition, as shown in FIGS. 17 to 20, the plurality of first touch electrodes 210 of the first touch structure 21 are arranged in at least three columns, and a column adjacent to the first target column M1 is a second target column M2. Some embodiments of the present disclosure will be schematically described below by taking an example in which the first touch electrodes 210 are arranged in 3 columns, but the embodiments of the present disclosure are not limited thereto, and 4 columns, 5 columns or more columns may also be taken into consideration, as long as the same technical concept is applied.

As shown in FIGS. 17 to 20, in a second sensing region T122, in the first direction X, the first touch electrodes 210 in each column except for the first target column M1 and the second target column M2 are connected through the first connection portions 201. In the second direction Y, the first touch electrodes 210 in different columns except for the first target column M1 and the second target column M2 are separated by the second touch electrodes 220.

Figure 17:
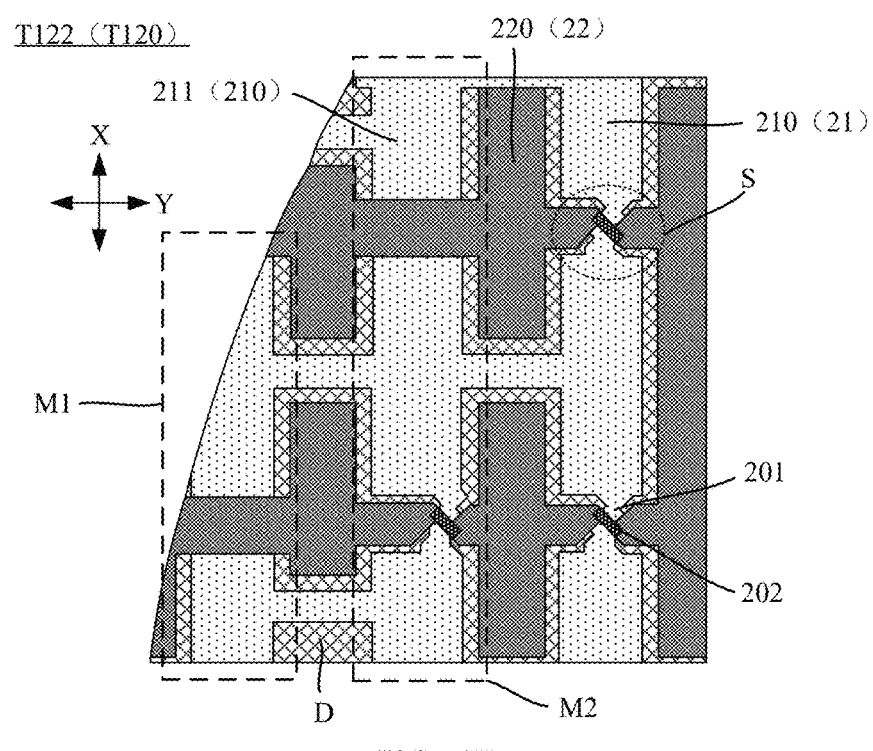
FIG. 17 is a partial enlarged view of a second sensing region of a display panel, in accordance with some embodiments.
Figure 19:
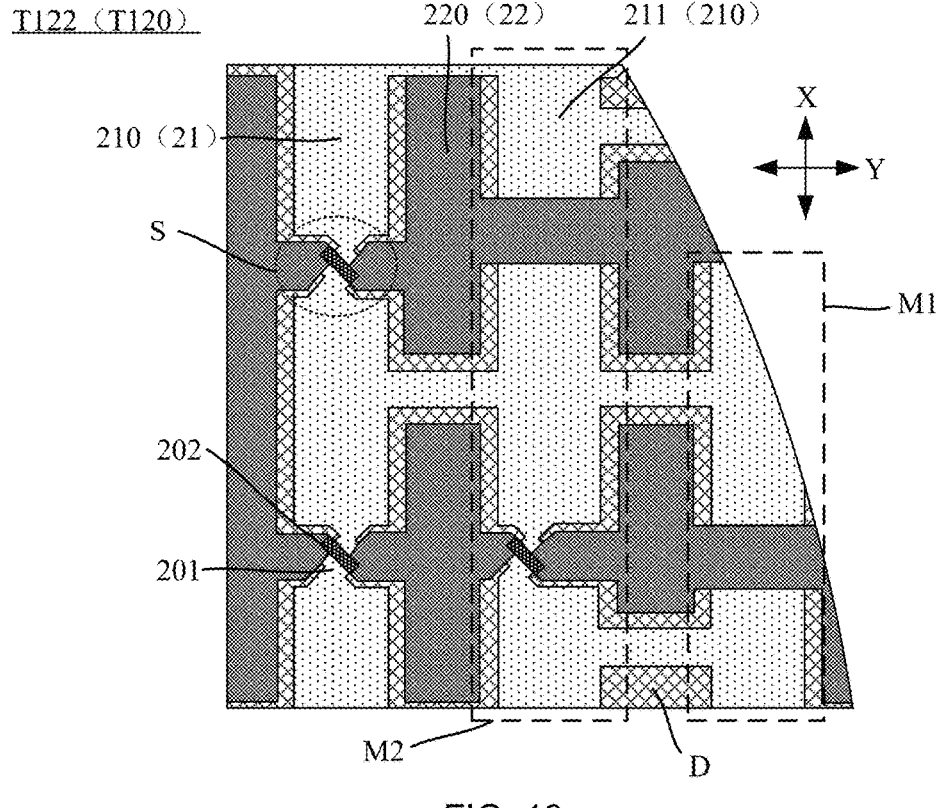
FIG. 19 is a partial enlarged view of yet another second sensing region of a display panel, in accordance with some embodiments.
Figure 20:
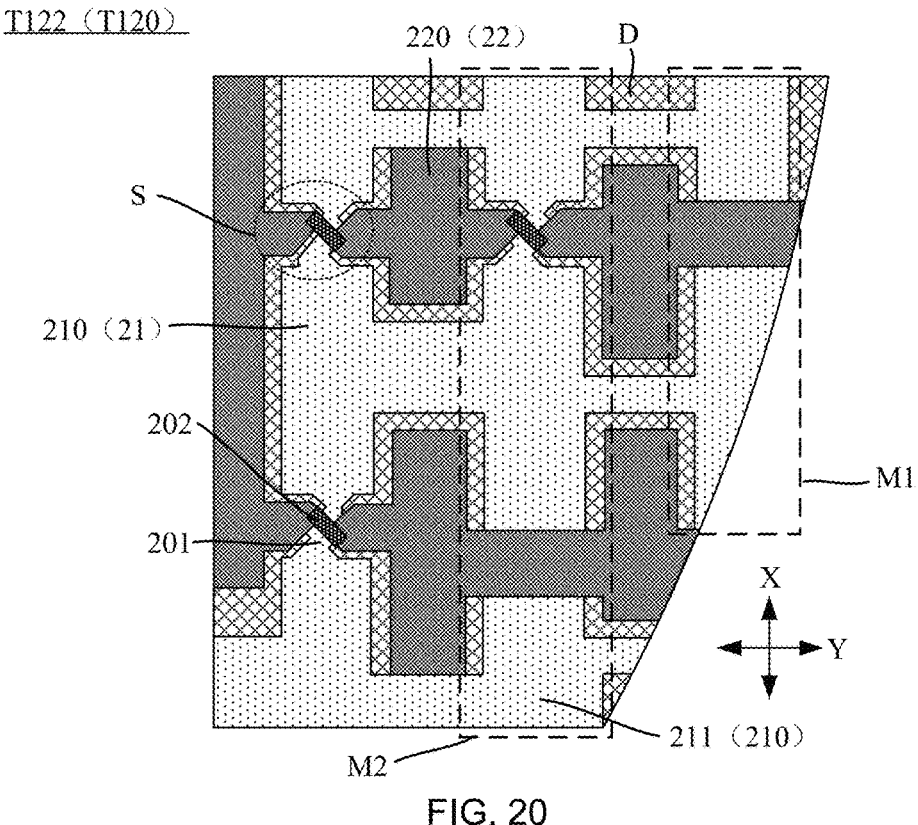
FIG. 20 is a partial enlarged view of still yet another second sensing region of a display panel, in accordance with some embodiments.

In some examples, as shown in FIGS. 17, 19 and 20, among the first touch electrodes 210 in the second target column M2, a first touch electrode 210 farthest from the first sensing region T121 is a first target touch electrode 211. In the first direction X, the first target touch electrode 211 and an adjacent first touch electrode 210 are separated by a second touch electrode 220, and in the second direction Y, the first target touch electrode 211 is connected to an adjacent first touch electrode 210.

Based on this, referring to FIGS. 17, 19 and 20, in the first direction X, other first touch electrodes 210 in the second target column M2 may be connected through the first connection portions 201. In the second direction Y, other first touch electrodes 210 in the second target column M2 may be separated by the second touch electrode 220, or may be connected to adjacent first touch electrodes 210.

Figure 18:
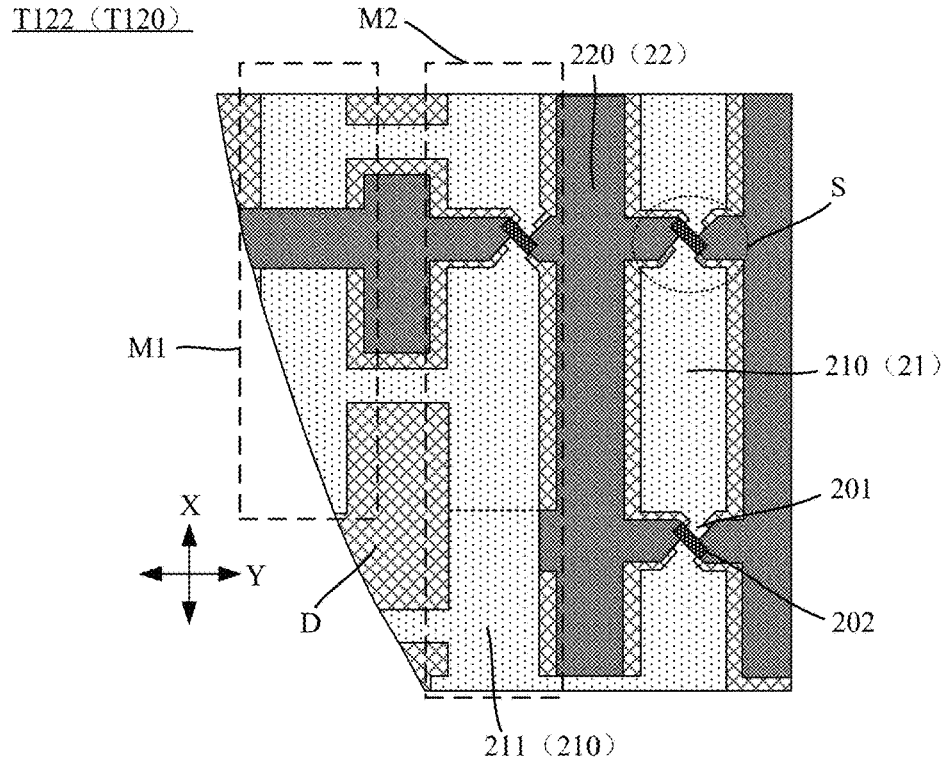
FIG. 18 is a partial enlarged view of another second sensing region of a display panel, in accordance with some embodiments.

In some other examples, as shown in FIG. 18, an end of the first target touch electrode 211 extends in the first direction X to a boundary of the second sensing region T122 away from the first sensing region T121, and the other end of the first target touch electrode 211 extends in the first direction X to an adjacent first touch electrode 210. In the second direction Y, the first target touch electrode 211 may be separated from an adjacent first touch electrode 210 by a second touch electrode 220, or may be connected to an adjacent first touch electrode 210.

Based on this, referring to FIG. 18, in the first direction X, other first touch electrodes 210 in the second target column M2 may be connected through the first connection portions 201. In the second direction Y, other first touch electrodes 210 in the second target column M2 may be separated by the second touch electrodes 220, or may be connected to adjacent first touch electrodes 210.

In some embodiments, referring to FIGS. 3 and 8, in the first direction X, the curved region B is located at least on opposite sides of the planar region C. The curved region B includes a third sub-curved region B3 connected to the planar region C. In a direction perpendicular to the boundary of the planar region C and from the planar region C to the curved region B, the curvature radius of the third sub-curved region B3 of the display substrate 10 decreases successively.

For example, as shown in FIG. 8, the curved region B may further include a fourth sub-curved region B4, and the fourth sub-curved region B4 is located on a side of the third sub-curved region B3 away from the planar region C. In the direction perpendicular to the boundary of the planar region C and from the planar region C to the curved region B, the curvature radius of the fourth sub-curved region B4 of the display substrate 10 increases successively.

It will be noted that the boundary between the third sub-curved region B3 and the fourth sub-curved region B4 may be the above-mentioned first boundary L1.

Based on this, as shown in FIGS. 8 and 9, in the first direction X, the peripheral sensing regions T11 located on opposite sides of the central sensing regions T12 are second side sensing regions T130, and the second side sensing region T130 overlaps with the third sub-curved region B3.

Referring to FIG. 9, FIG. 10, and FIGS. 21 to 26, in a second side sensing region T130, in the first direction X, a distance between a boundary of the second side sensing region T130 away from the central sensing regions T12 and a nearest first connection portion 201 is greater than a distance between a corresponding boundary of a central sensing region T12 and a nearest first connection portion 201.

That is, in comparison with the central sensing region T12, the positions of the bridge sub-regions S in the second side sensing regions T130 are shifted toward the center of the display panel 100, which increases the curvature radiuses of the bridge sub-regions S of the display panel 100, and reduces the risk of cracks or breakage of the display panel 100 in the bridge sub-regions S of the second side sensing regions T130, thereby improving the production yield of the display panel 100.

For example, referring to FIG. 9, the second side sensing regions T130 include a plurality of third sensing regions T131 and a plurality of fourth sensing regions T132. In the first direction X, the plurality of fourth sensing regions T132 are located on opposite sides of the plurality of third sensing regions T131.

Figure 21:
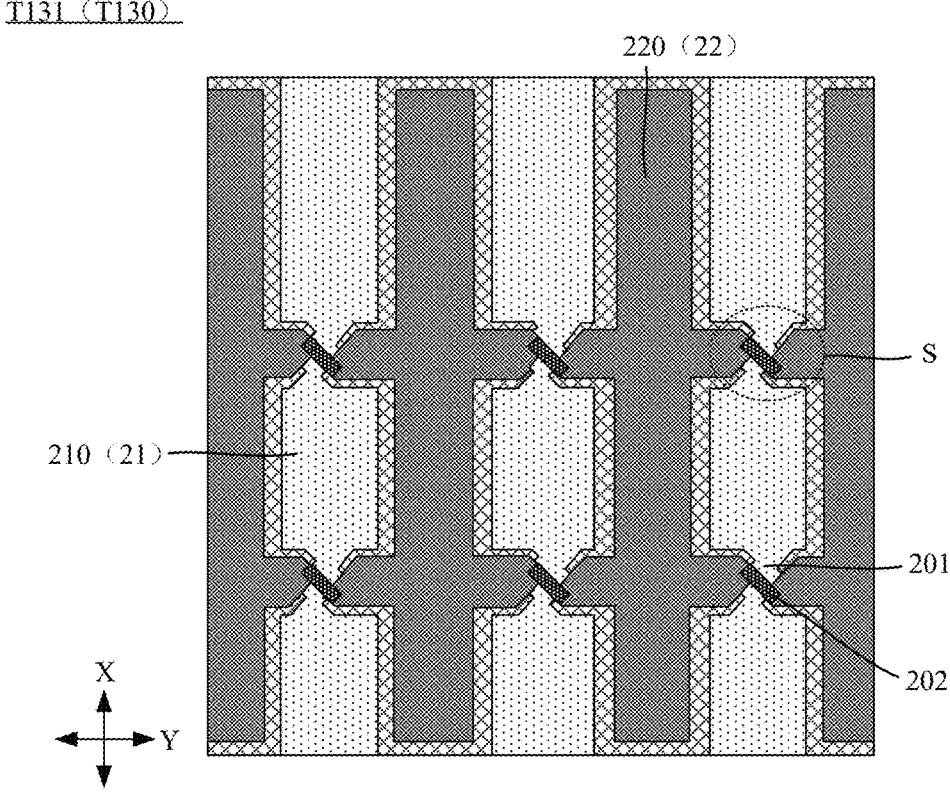
FIG. 21 is a partial enlarged view of a third sensing region of a display panel, in accordance with some embodiments.
Figure 22:
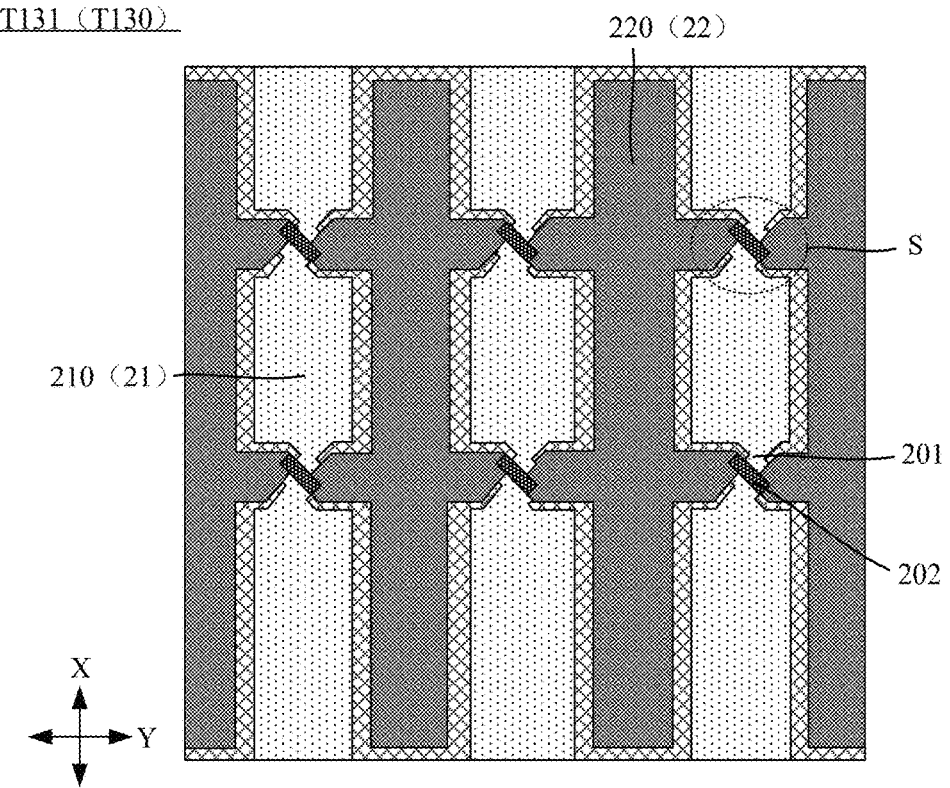
FIG. 22 is a partial enlarged view of another third sensing region of a display panel, in accordance with some embodiments.

As shown in FIGS. 21 and 22, in a third sensing region T131, in the first direction X, the first touch electrodes 210 in each column are connected through the first connection portions 201, and in the second direction Y, adjacent first touch electrodes 210 are separated by the second touch electrodes 220. FIGS. 21 and 22 are illustrated by taking an example in which the plurality of first touch electrodes 210 of the first touch structure 21 are arranged in three columns.

Figure 23:
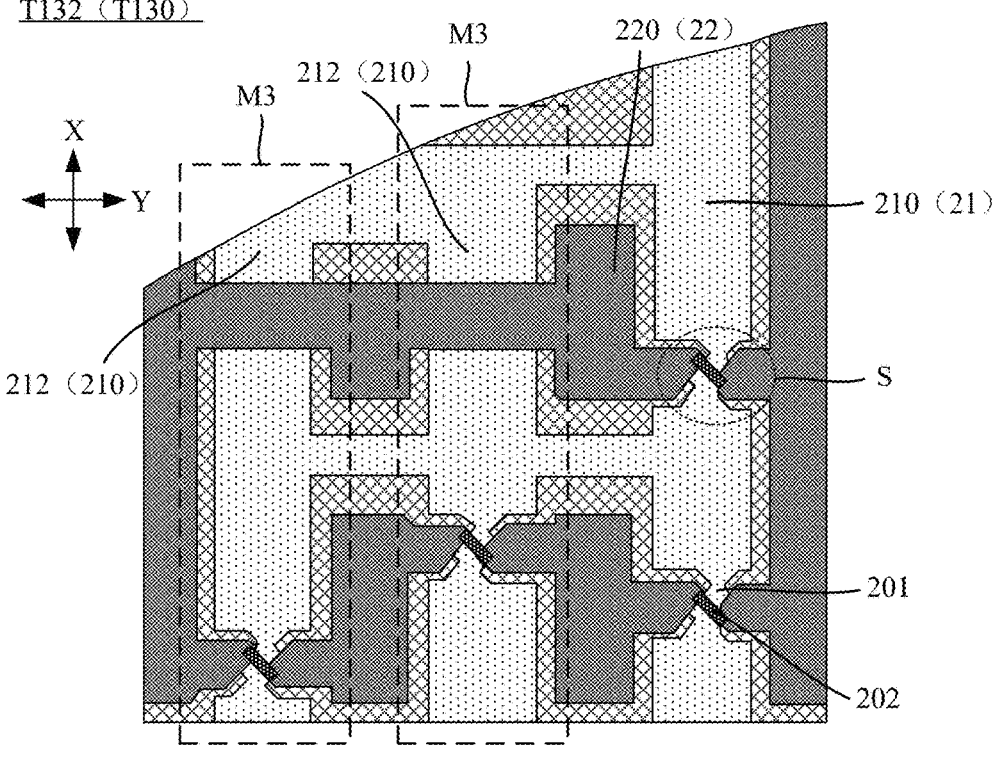
FIG. 23 is a partial enlarged view of a fourth sensing region of a display panel, in accordance with some embodiments.
Figure 24:
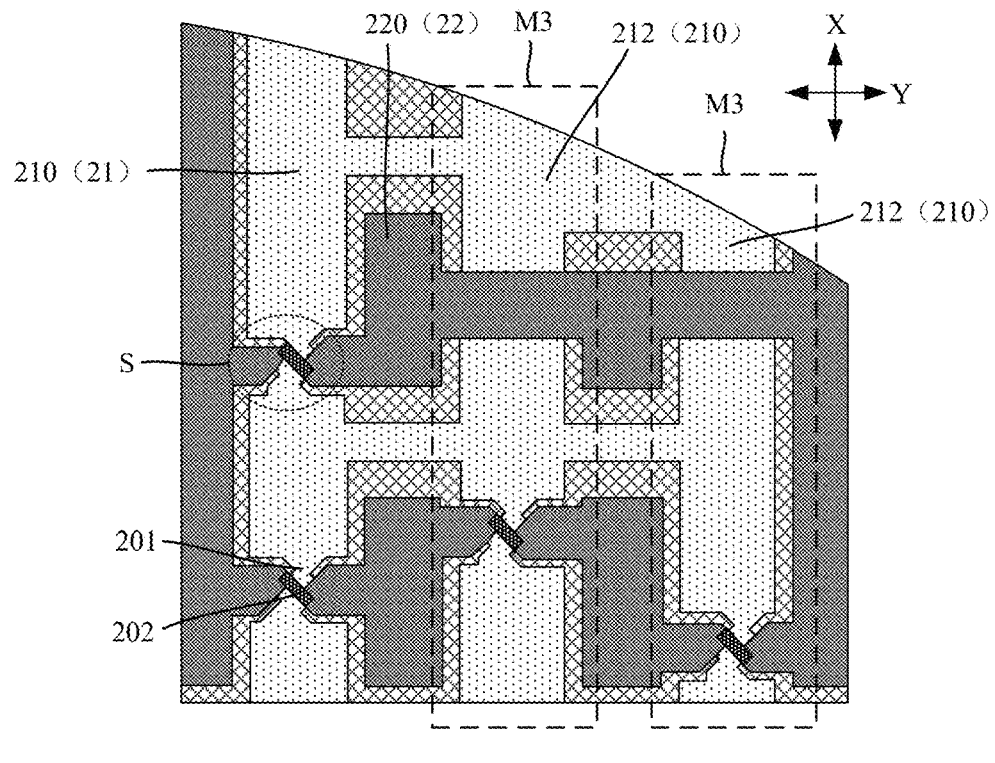
FIG. 24 is a partial enlarged view of another fourth sensing region of a display panel, in accordance with some embodiments.
Figure 25:
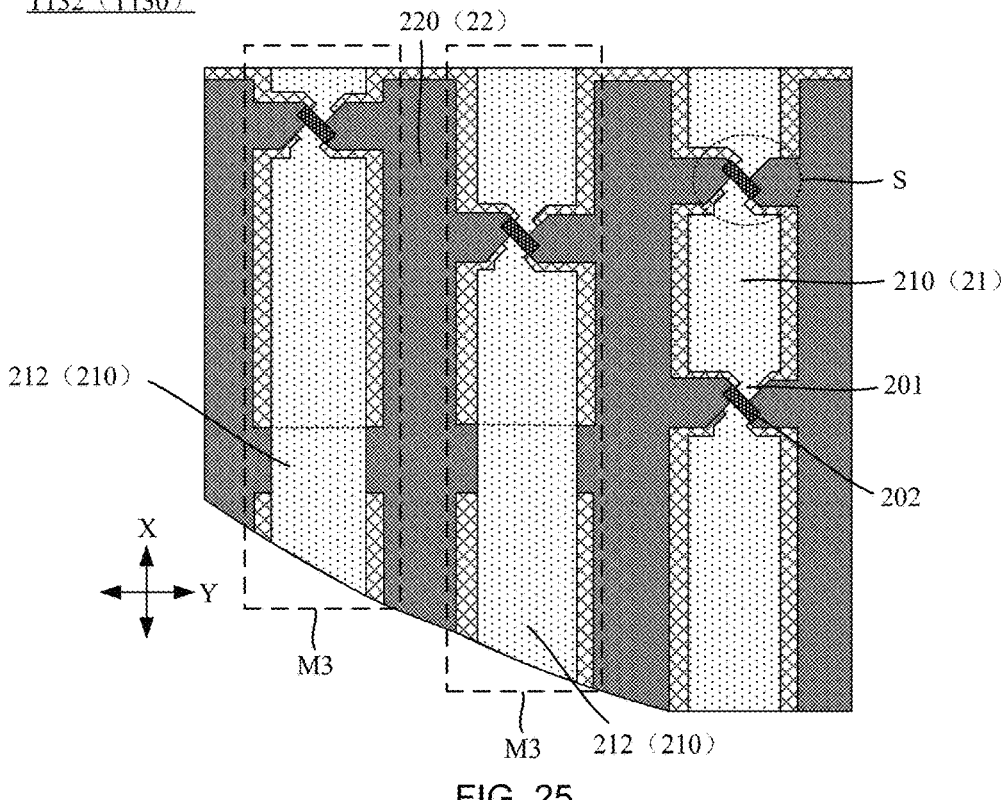
FIG. 25 is a partial enlarged view of yet another fourth sensing region of a display panel, in accordance with some embodiments.
Figure 26:
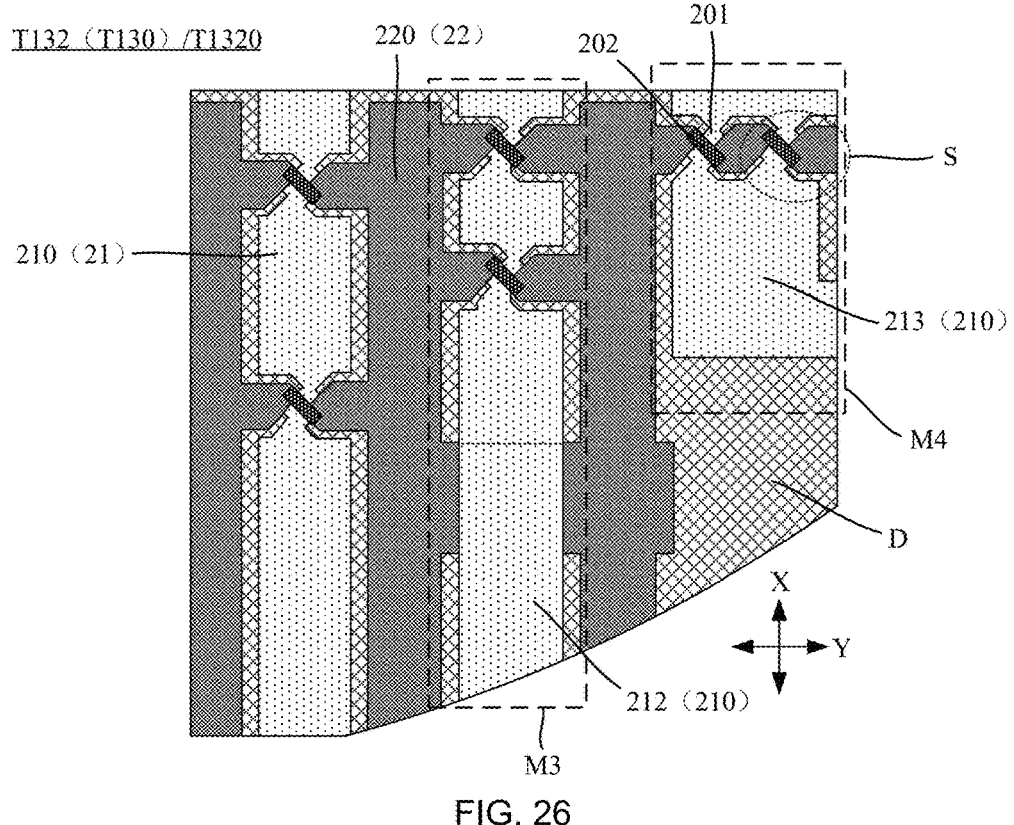
FIG. 26 is a partial enlarged view of still yet another fourth sensing region of a display panel, in accordance with some embodiments.

In addition, as shown in FIGS. 23 to 26, the plurality of first touch electrodes 210 of the first touch structure 21 are arranged in at least three columns, and in a fourth sensing region T132, at least one column of first touch electrodes 210 that is away from the third sensing regions T131 is a third target column M3. FIGS. 23, 24 and 25 are illustrated by taking an example in which there are two third target columns M3, and FIG. 26 is illustrated by taking an example in which there is one third target column M3.

Some embodiments of the present disclosure will be schematically described below by taking an example in which the first touch electrodes 210 are arranged in 3 columns, but the embodiments of the present disclosure are not limited thereto, and 4 columns, 5 columns or more columns may also be taken into consideration, as long as the same technical concept is applied.

As shown in FIGS. 23 to 26, in the fourth sensing region T132, in the first direction X, the first touch electrodes 210 in each column except for the third target columns M3 are connected through the first connection portions 201, and in the second direction Y, the first touch electrodes 210 in different columns except for the third target columns M3 are separated by the second touch electrode 220.

In some examples, as shown in FIGS. 23 and 24, among the first touch electrodes 210 in the third target column M3, a first touch electrode 210 farthest from the central sensing regions T12 is a second target touch electrode 212. In the first direction X, the second target touch electrode 212 is separated from an adjacent first touch electrode 210 by a second touch electrode 220, and in the second direction Y, the second target touch electrode 212 is connected to an adjacent first touch electrode 210.

Based on this, referring to FIGS. 23 and 24, in the first direction X, other first touch electrodes 210 in the third target column M3 may be connected through the first connection portions 201. In the second direction Y, other first touch electrodes 210 in the third target column M3 may be separated by the second touch electrode 220, or may be connected to adjacent first touch electrodes 210.

In some other examples, as shown in FIGS. 25 and 26, an end of the second target touch electrode 212 extends in the first direction X to a boundary of the fourth sensing region T132 away from the central sensing regions T12, and the other end of the second target touch electrode 212 extends in the first direction X to an adjacent first touch electrode 210. In the second direction Y, the second target touch electrode 212 may be separated from an adjacent first touch electrode 210 by a second touch electrode 220, or may be connected to an adjacent first touch electrode 210.

Based on this, referring to FIGS. 25 and 26, in the first direction X, other first touch electrodes 210 in the third target column M3 may be connected through the first connection portions 201; and in the second direction Y, other first touch electrodes 210 in the third target column M3 may be separated by the second touch electrodes 220, and may also be connected to adjacent first touch electrodes 210.

In some embodiments, as shown in FIGS. 9, 14 and 26, a corner sensing region T110 among the corner sensing regions T110 is a target corner sensing region T111, and a fourth sensing region T132 adjacent to the target corner sensing region T111 is a target fourth sensing region T1320.

As shown in FIGS. 9 and 14, in the target corner sensing region T111, a second touch electrode 220 extends to a boundary of the target corner sensing region T111 in the second direction Y, and in the first direction X, a first touch electrode 210 is located on a side of the second touch electrode 220 away from an adjacent peripheral sensing region T11 (referring to FIG. 8) and extends to the boundary of the target corner sensing region T111. In this case, a second touch structure 22 to which the second touch electrode 220 belongs may be led out from a side of the target corner sensing region T111 in the second direction Y and connected to a corresponding touch lead 50, and a first touch structure 21 to which the first touch electrode 210 belongs may be led out from a side of the target corner sensing region T111 in the first direction X and connected to a corresponding touch lead 50.

As shown in FIGS. 9 and 26, in the target fourth sensing region T1320, a column of first touch electrodes 210 proximate to the target corner sensing region T111 is a fourth target column M4. Among the first touch electrodes 210 in the fourth target column M4, a first touch electrode 210 farthest from the central sensing regions T12 is a third target touch electrode 213. In the first direction X, the third target touch electrode 213 is connected to an adjacent first touch electrode (e.g., the fourth target touch electrode 214 mentioned below) through a first connection portion 201, and in the second direction Y, the third target touch electrode 213 is directly connected to a first touch electrode 210 in the target corner sensing region T111.

It will be noted that, in the target fourth sensing region T1320, in the first direction X, a dummy electrode D may be provided on a side of the third target touch electrode 213 away from the central sensing regions T12, which is not specifically limited in the embodiments of the present disclosure.

Figure 27:
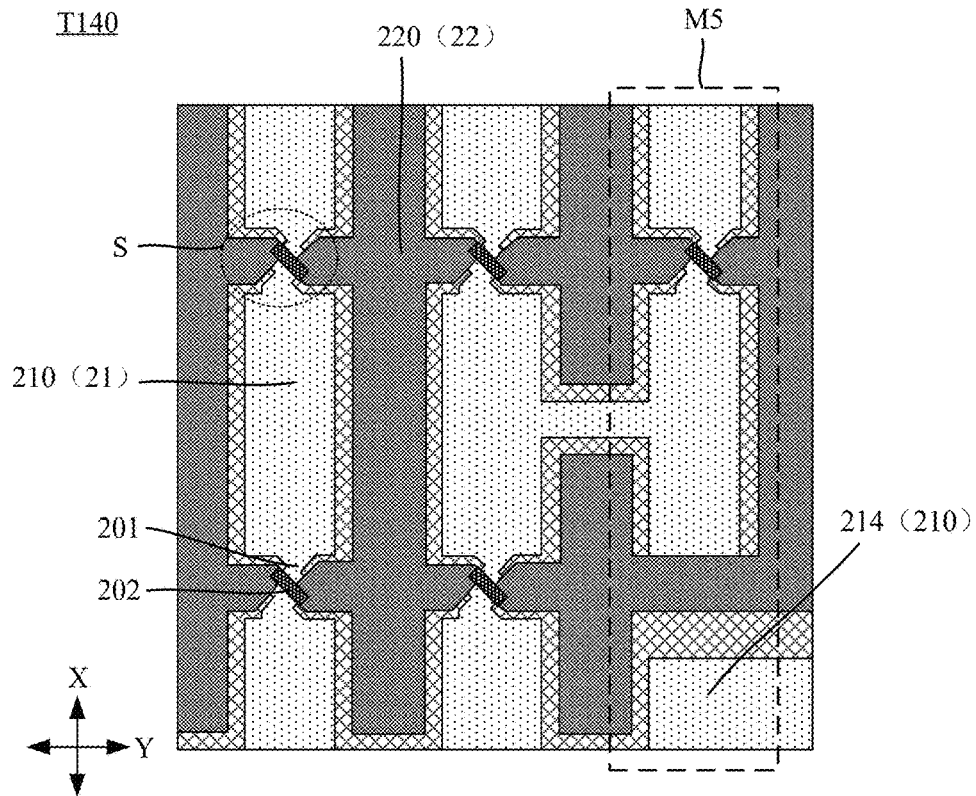
FIG. 27 is a partial enlarged view of a fifth sensing region of a display panel, in accordance with some embodiments.
Figure 28:
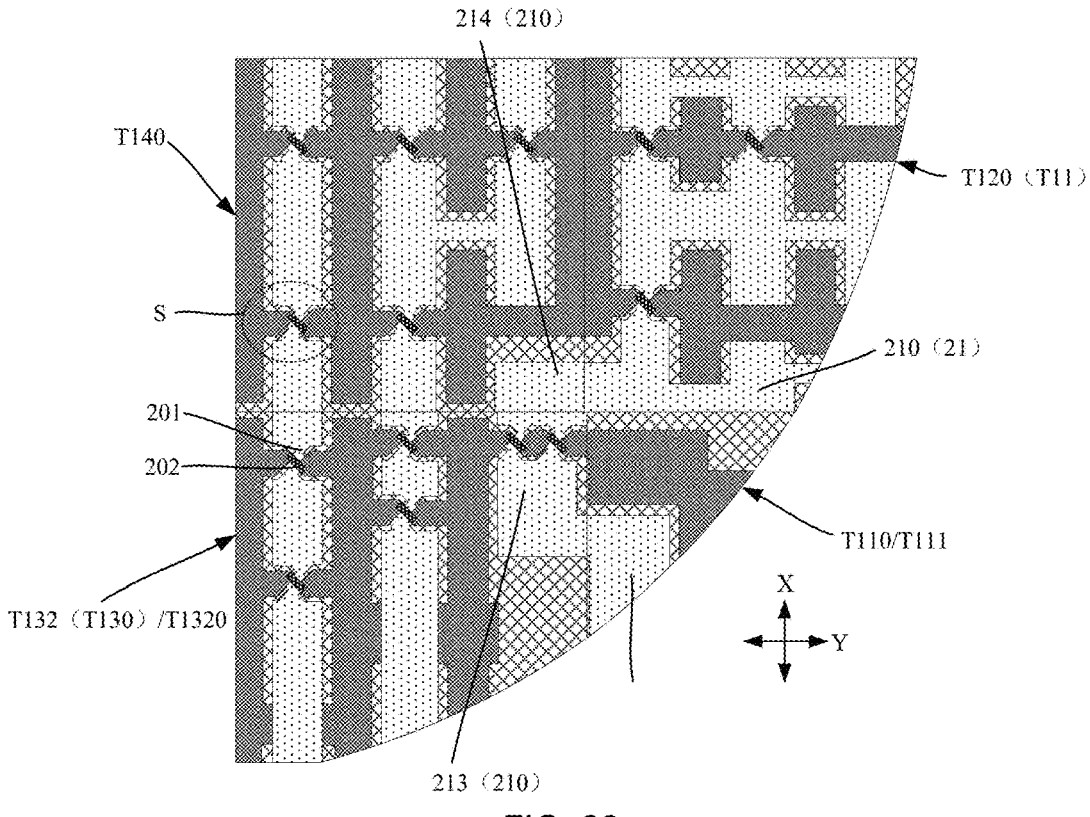
FIG. 28 is a partial enlarged view of multiple sensing regions adjacent to a target corner sensing region of a display panel, in accordance with some embodiments.

Based on this, referring to FIG. 9 and FIGS. 27 and 28, in the first direction X, a sensing region T10 adjacent to the target fourth sensing region T1320 is a fifth sensing region T140.

As shown in FIG. 9 and FIGS. 27 and 28, in the fifth sensing region T140, a column of first touch electrodes 210 farthest from the central sensing regions T12 is a fifth target column M5. Among the first touch electrodes 210 in the fifth target column M5, a first touch electrode 210 nearest to the target fourth sensing region T1320 is a fourth target touch electrode 214. In the first direction X, the fourth target touch electrode 214 is separated from an adjacent first touch electrode 210 by a second touch electrode 220, and is connected to the third target touch electrode 213. In the second direction Y, the fourth target touch electrode 214 is directly connected to a first touch electrode 210 in an adjacent peripheral sensing region T11.

In this case, the first touch structure 21 in a column of peripheral sensing regions T11 corresponding to the target corner sensing region T111 may be connected to a first touch electrode 210 in the target corner sensing region T111 sequentially through the fourth target touch electrode 214 and the third target touch electrode 213, and may be led out from a side of the target corner sensing region T111 in the first direction X to be connected to a corresponding touch lead 50.

Here, referring to FIGS. 26, 27 and 28, the above third target touch electrode 213 and the fourth target touch electrode 214 may be connected through at least two first connection portions 201. The number of first connection portions 201 between the third target touch electrode 213 and the fourth target touch electrode 214 may be the same as the number of columns of the first touch electrodes 210 except for the first target column M1 in the first side sensing region T120.

For example, as shown in FIGS. 20, 26, 27 and 28, the first touch electrodes 210 in the first side sensing region T120 are arranged in 3 columns, and there is one first target column M1. That is, the number of columns of the first touch electrodes 210 except for the first target column M1 in the first side sensing region T120 is two, and the third target touch electrode 213 is connected to the fourth target touch electrode 214 through two first connection portions 201, so that the touch signal may be transmitted more stably and the touch sensitivity is high.

Figure 29:
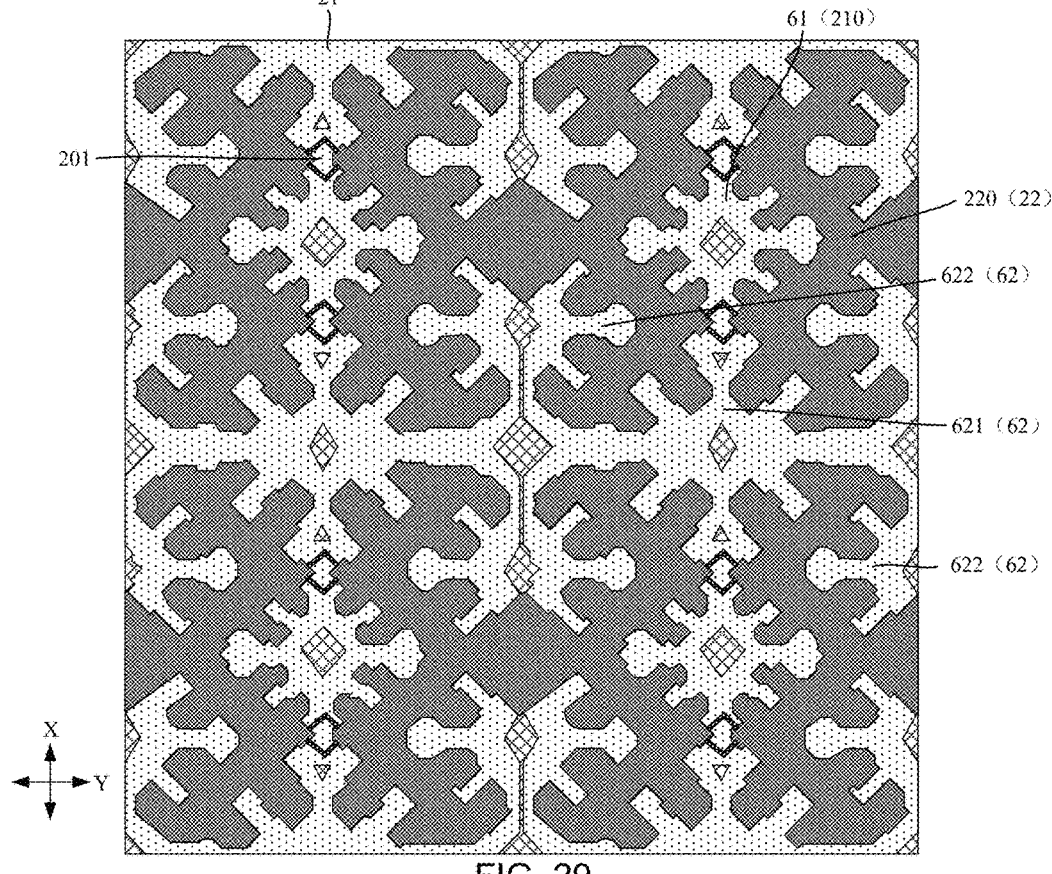
FIG. 29 is a partial enlarged view of a center of a display panel, in accordance with some embodiments.

In some embodiments, referring to FIG. 29, a plurality of first touch electrodes 210 of a first touch structure 21 include a plurality of first electrode patterns 61 and a plurality of second electrode patterns 62, and the plurality of first electrode patterns 61 and the plurality of second electrode patterns 62 are alternately arranged in the first direction X. A first electrode pattern 61 is connected to a second electrode pattern 62 through a first connection portion 201.

The second electrode pattern 62 includes an electrode body 621 and an electrode branch 622, and the electrode branch 622 is disposed on opposite sides of the electrode body 621 in the second direction Y and connected to the electrode body 621.

In some examples, referring to FIGS. 30 to 33, the display panel 100 further includes first residual electrode patterns 631, and the first residual electrode pattern 631 is a portion of a second electrode pattern 62 of a first touch structure 21 that still remains after the electrode branch 622 and the electrode body 621 of the second electrode pattern 62 are cut off by a boundary of the touch region T.

Figure 30:
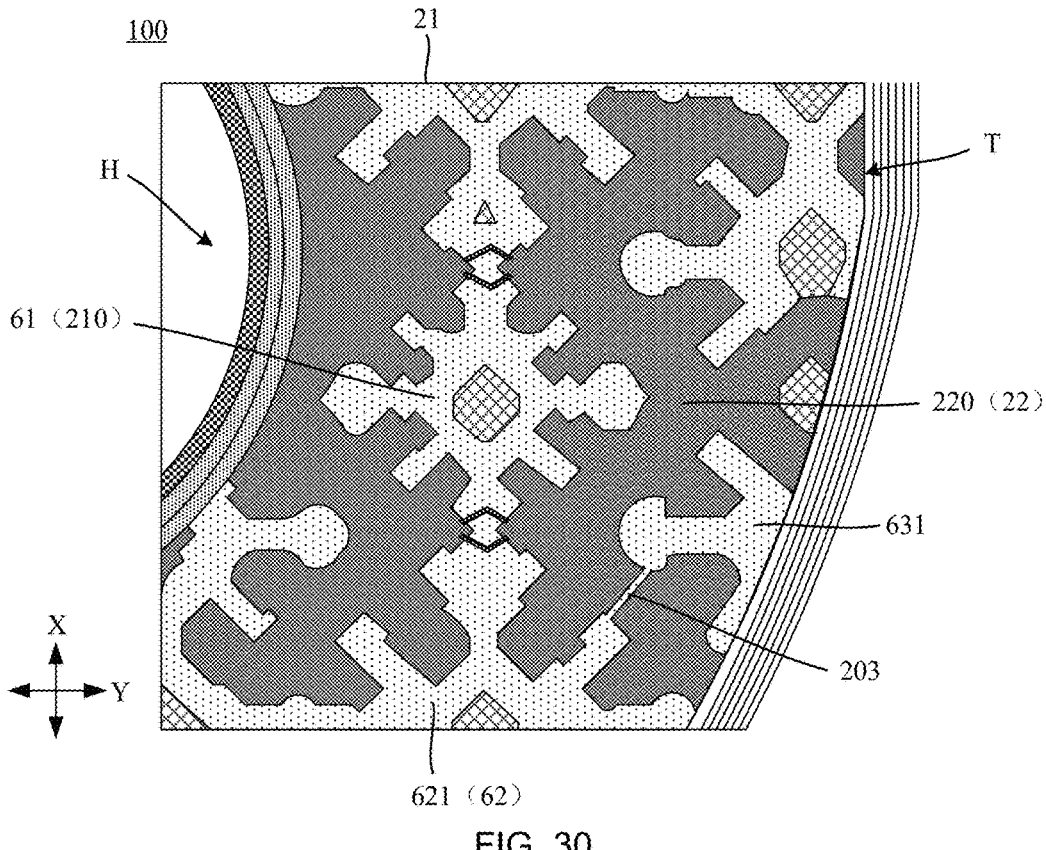
FIG. 30 is a partial enlarged view of a light-transmitting hole edge and a circumferential edge of a display panel, in accordance with some embodiments.
Figure 31:
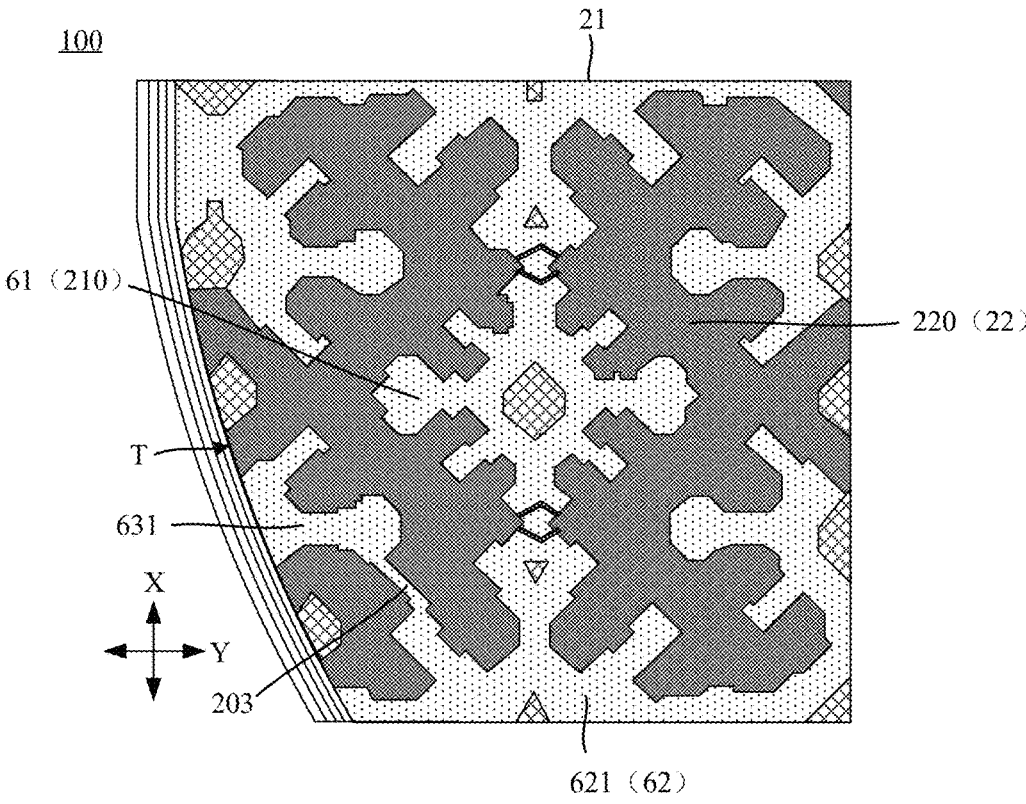
FIG. 31 is a partial enlarged view of a circumferential edge of a display panel, in accordance with some embodiments.
Figure 32:
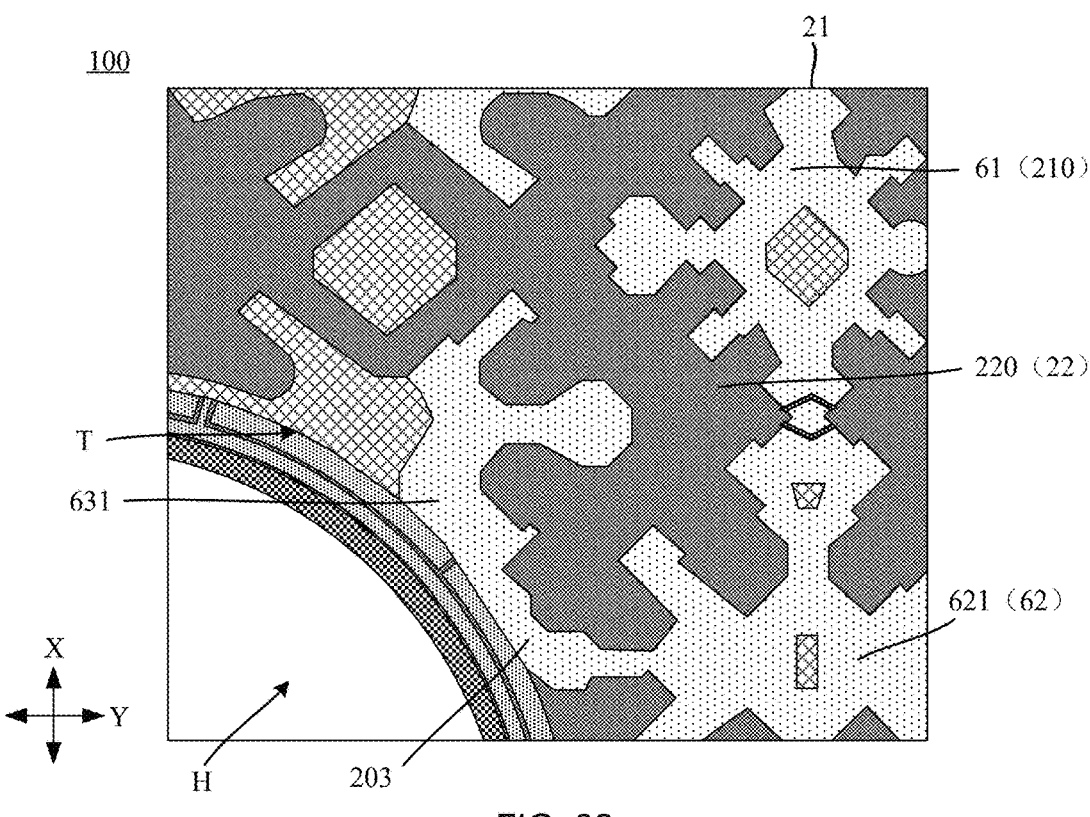
FIG. 32 is a partial enlarged view of a light-transmitting hole edge and a circumferential edge of another display panel, in accordance with some embodiments.
Figure 33:
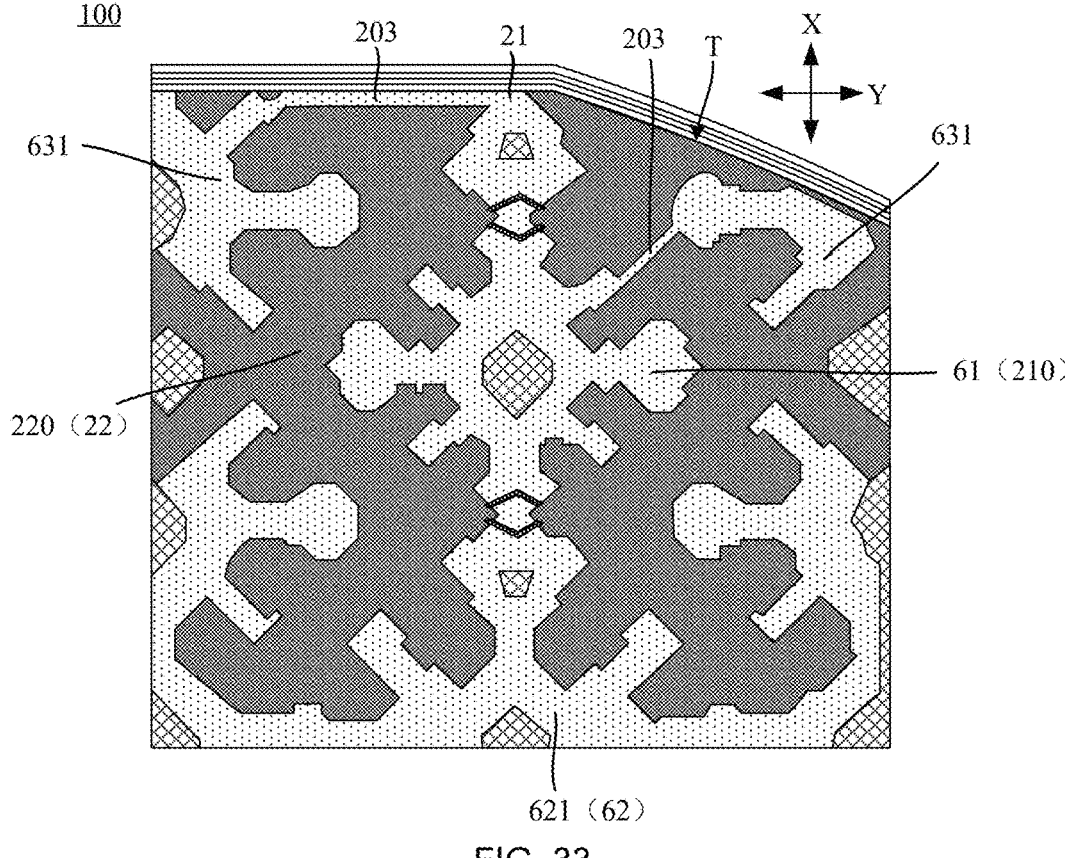
FIG. 33 is a partial enlarged view of a circumferential edge of another display panel, in accordance with some embodiments.

Here, referring to FIGS. 31 and 33, the boundary of the touch region T includes the outer boundary of the touch region T in the circumferential direction. Referring to FIGS. 30 and 32, the boundary of the touch region T further includes a boundary of a light-transmitting hole H that is opened in the display panel 100 for transmitting external ambient light, and the first touch structures 21 and the second touch structures 22 avoid the boundary of the light-transmitting hole H.

For example, as shown in FIGS. 30, 31 and 33, the first residual electrode pattern 631 is a portion of a second electrode pattern 62 of a first touch structure 21 that still remains after the electrode branch 622 and the electrode body 621 of the second electrode pattern 62 are cut off by the outer boundary of the touch region T in the circumferential direction.

For another example, as shown in FIG. 32, the first residual electrode pattern 631 is a portion of a second electrode pattern 62 of a first touch structure 21 that still remains after the electrode branch 622 and the electrode body 621 of the second electrode pattern 62 are cut off by a boundary of the touch region T for avoiding the light-transmitting hole H.

Based on this, referring to FIGS. 30 to 33, the display panel 100 further includes a third connection portion 203, and the first residual electrode pattern 631 is connected to an electrode body 621 or a first electrode pattern 61 of the corresponding first touch structure 21 through the third connection portion 203, so that the first residual electrode pattern 631 receives a touch signal. As a result, the touch sensing area is increased, and the touch sensitivity at the edge of the touch region T is improved.

It will be noted that, the third connection portion 203 may be disposed in the same layer as the first touch electrodes 210. Furthermore, the term "the corresponding first touch structure 21" refers to a first touch structure 21 that the first residual electrode pattern 631 belongs to before being cut off.

Figure 34:
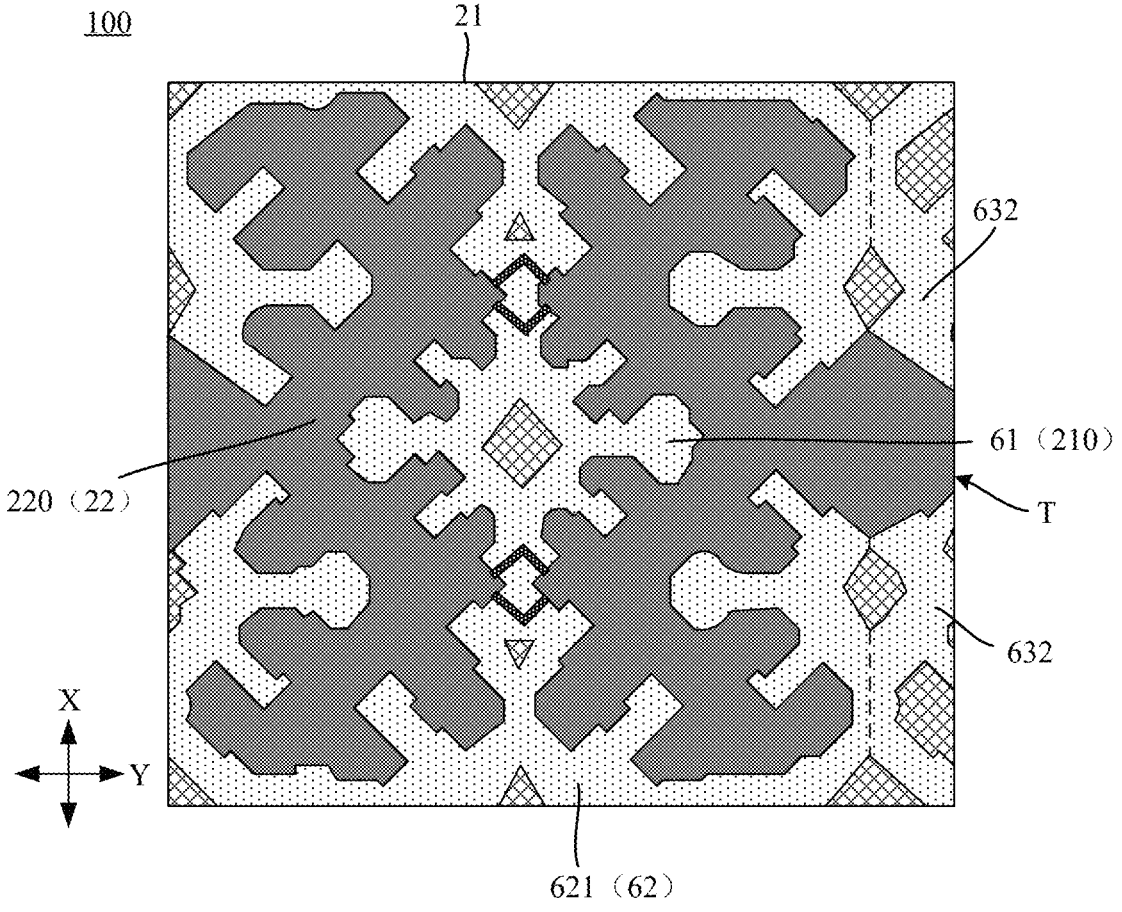
FIG. 34 is a partial enlarged view of a circumferential edge of yet another display panel, in accordance with some embodiments.

In some examples, referring to FIG. 34, the display panel 100 further includes a second residual electrode pattern 632, and the second residual electrode pattern 632 is a portion of a first touch structure 21 that remains after being cut off by the boundary of the touch region T. The second residual electrode pattern 632 is connected to another adjacent first touch structure 21, so that the second residual electrode pattern 632 receives a touch signal. As a result, the touch sensing area is increased, and the touch sensitivity at the edge of the touch region T is improved.

The foregoing descriptions are merely specific embodiments of the present disclosure, but the protection scope of the present disclosure is not limited thereto, and any variation or substitution that a person skilled in the art may conceive of within the technical scope of the present disclosure should be included in the protection scope of the present disclosure. Therefore, the protection scope of the present disclosure should be subject to the protection scope of the claims.

What is claimed is:

1. A display panel, comprising:

a display substrate having a light exit surface and a non-light exit surface, wherein a display region of the display substrate has a curved region;

a plurality of first touch structures disposed on the light exit surface of the display substrate and extending in a first direction, wherein a first touch structure includes a plurality of first touch electrodes and a plurality of first connection portions, the plurality of first touch electrodes are arranged in one or more columns, each column includes at least two first touch electrodes arranged at intervals in the first direction, and first touch electrodes in at least one column of the one or more columns are connected through first connection portions of the plurality of first connection portions; and a plurality of second touch structures disposed on the light exit surface of the display substrate and extending in a second direction, the second direction intersecting with the first direction; wherein a second touch structure includes a plurality of second touch electrodes and a plurality of second connection portions; the plurality of second touch electrodes are arranged in one or more rows, each row includes at least two second touch electrodes arranged at intervals in the second direction, and second touch electrodes in at least one row of the one or more rows are connected through second connection portions of the plurality of second connection portions; the plurality of first touch electrodes and the plurality of second touch electrodes are disposed in a same layer, and the plurality of first touch electrodes are disposed in a same layer as the plurality of first connection portions or the plurality of second connection portions;

wherein an overlapping region where an orthographic projection of a second connection portion of the plurality of second connection portions on the display substrate partially overlaps with an orthographic projection of a first connection portion of the plurality of first connection portions on the display substrate is a bridge sub-region; the plurality of first connection portions and the plurality of second connection portions define a plurality of bridge sub-regions, and at least one bridge sub-region of the plurality of bridge sub-regions is located in the curved region, and a curvature radius of the display substrate is greater than or equal to 4.5 mm in a bridge sub-region of the curved region;

wherein the display substrate includes a planar region and the curved region located on at least one side of the planar region; a region where a first touch structure overlaps with a second touch structure is a sensing region, and the plurality of first touch structures and the plurality of second touch structures define a plurality of sensing regions arranged in an array; and sensing regions located at the outermost among the plurality of sensing regions are peripheral sensing regions, and other sensing regions among remaining sensing regions that are not adjacent to the peripheral sensing regions are central sensing regions; the central sensing regions are located in the planar region, and at least one peripheral sensing region overlaps with the curved region; a number of bridge sub-regions in peripheral sensing regions overlapping with the curved region is less than or equal to a number of bridge sub-regions in the central sensing regions.

2. The display panel according to claim 1, wherein peripheral sensing regions located at corners are corner sensing regions, and a corner sensing region overlaps with the curved region; wherein in the corner sensing region, a first touch electrode extends to a boundary of the corner sensing region in the first direction, and a second touch electrode is located on a side of the first touch electrode proximate to an adjacent peripheral sensing region in the second direction; or in the corner sensing region, the second touch electrode extends to the boundary of the corner sensing region in the second direction, and the first touch electrode is located on at least one side of the second touch electrode in the first direction.

3. The display panel according to claim 1, wherein the curved region is located at least on opposite sides of the planar region in the second direction; the curved region includes a first sub-curved region connected to the planar region, and in a direction perpendicular to a boundary of the planar region and from the planar region to the curved region, a curvature radius of the first sub-curved region of the display substrate decreases successively;

in the second direction, peripheral sensing regions located on opposite sides of the central sensing regions are first side sensing regions, wherein a first side sensing region overlaps with the first sub-curved region; the plurality of first touch electrodes of the first touch structure are arranged in at least two columns, and at least one column farthest from the central sensing regions is a first target column; and in the first side sensing region, first touch electrodes in at least one column except for the first target column are connected through first connection portions in the first direction; in the first direction, first touch electrodes in the first target column are separated by second touch electrodes; and in the second direction, the first touch electrodes in the first target column are connected to adjacent first touch electrodes.

4. The display panel according to claim 3, wherein the first side sensing regions include a plurality of first sensing regions and a plurality of second sensing regions, and the plurality of second sensing regions are located on opposite sides of the plurality of first sensing regions in the first direction; wherein in a first sensing region, first touch electrodes in each column except for the first target column are connected through first connection portions in the first direction, and first touch electrodes in different columns except for the first target column are separated by a second touch electrode in the second direction.

5. The display panel according to claim 3, wherein the first side sensing regions include a plurality of first sensing regions and a plurality of second sensing regions, and the plurality of second sensing regions are located on opposite sides of the plurality of first sensing regions in the first direction; the plurality of first touch electrodes of the first touch structure are arranged in at least three columns, and a column adjacent to the first target column is a second target column; wherein in a second sensing region, first touch electrode in each column except for the first target column and the second target column are connected through first connection portions in the first direction, and first touch electrodes in different columns except for the first target column and the second target column are separated by a second touch electrode in the second direction; and among first touch electrodes in the second target column, a first touch electrode farthest from a first sensing region is a first target touch electrode; wherein the first target touch electrode and an adjacent first touch electrode in the first direction are separated by a second touch electrode, and the first target touch electrode is connected to an adjacent first touch electrode in the second direction; or an end of the first target touch electrode extends in the first direction to a boundary of the second sensing region away from the plurality of first sensing regions, and another end of the first target touch electrode extends in the first direction to an adjacent first touch electrode.

6. The display panel according to claim 3, wherein the curved region further includes a second sub-curved region, the second sub-curved region is located on a side of the first sub-curved region away from the planar region, and in the direction perpendicular to the boundary of the planar region and from the planar region to the curved region, a curvature radius of the second sub-curved region of the display substrate increases successively.

7. The display panel according to claim 1, wherein in the first direction, the curved region is located at least on opposite sides of the planar region; the curved region includes a third sub-curved region connected to the planar region, and in a direction perpendicular to a boundary of the planar region and from the planar region to the curved region, a curvature radius of the third sub-curved region of the display substrate decreases successively; wherein in the first direction, peripheral sensing regions located on opposite sides of the central sensing regions are second side sensing regions, and a second side sensing region overlaps with the third sub-curved region; and in the second side sensing region, in the first direction, a distance between a boundary of the second side sensing region away from the central sensing regions and a nearest first connection portion is greater than a distance between a corresponding boundary of a central sensing region to a nearest first connection portion.

8. The display panel according to claim 7, wherein the second side sensing regions include a plurality of third sensing regions and a plurality of fourth sensing regions, and the plurality of fourth sensing regions are located on opposite sides of the plurality of third sensing regions in the first direction; wherein in a third sensing region, first touch electrodes in each column are connected through first connection portions in the first direction, and adjacent first touch electrodes in the second direction are separated by a second touch electrode.

9. The display panel according to claim 7, wherein the second side sensing regions include a plurality of third sensing regions and a plurality of fourth sensing regions, and the plurality of fourth sensing regions are located on opposite sides of the plurality of third sensing regions in the first direction; the plurality of first touch electrodes of the first touch structure are arranged in at least three columns, and in a fourth sensing region, at least one column of first touch electrodes away from the plurality of third sensing regions is a third target column; wherein in the fourth sensing region, first touch electrodes in each column except for the third target column are connected through first connection portions in the first direction, and first touch electrodes in different columns except for the third target column are separated by a second touch electrode in the second direction; and among first touch electrodes in the third target column, a first touch electrode farthest from the central sensing regions is a second target touch electrode; wherein the second target touch electrode is separated from an adjacent first touch electrode by a second touch electrode in the first direction, and the second target touch electrode is connected to an adjacent first touch electrode in the second direction; or an end of the second target touch electrode extends in the first direction to a boundary of the fourth sensing region away from the central sensing regions, and another end of the second target touch electrode extends in the first direction to an adjacent first touch electrode.

10. The display panel according to claim 9, wherein peripheral sensing regions located at corners are a plurality of corner sensing regions; a corner sensing region among the plurality of corner sensing regions is a target corner sensing region, and a fourth sensing region adjacent to the target corner sensing region is a target fourth sensing region; wherein in the target corner sensing region, a second touch electrode extends to a boundary of the target corner sensing region in the second direction, and in the first direction, a first touch electrode is located on a side of the second touch electrode away from an adjacent peripheral sensing region and extends to the boundary of the target corner sensing region; and in the target fourth sensing region, a column of first touch electrodes proximate to the target corner sensing region is a fourth target column; among first touch electrodes in the fourth target column, a first touch electrode farthest from the central sensing regions is a third target touch electrode; in the first direction, the third target touch electrode is connected to an adjacent first touch electrode through a first connection portion; and in the second direction, the third target touch electrode is directly connected to a first touch electrode in the target corner sensing region.

11. The display panel according to claim 10, wherein in the first direction, a sensing region adjacent to the target fourth sensing region is a fifth sensing region; wherein in the fifth sensing region, a column of first touch electrodes farthest from the central sensing regions is a fifth target column; among first touch electrodes in the fifth target column, a first touch electrode nearest to the target fourth sensing region is a fourth target touch electrode; in the first direction, the fourth target touch electrode is separated from an adjacent first touch electrode by a second touch electrode and is connected to the third target touch electrode; in the second direction, the fourth target touch electrode is directly connected to a first touch electrode of an adjacent peripheral sensing region.

12. The display panel according to claim 11, wherein the third target touch electrode is connected to the fourth target touch electrode through at least two first connection portions.

13. The display panel according to claim 7, wherein the curved region further includes a fourth sub-curved region, and the fourth sub-curved region is located on a side of the third sub-curved region away from the planar region; in the direction perpendicular to the boundary of the planar region and from the planar region to the curved region, a curvature radius of the fourth sub-curved region of the display substrate increases successively.

14. The display panel according to claim 1, wherein in a central sensing region of the central sensing regions, first touch electrodes in each column are connected through first connection portions in the first direction, and adjacent first touch electrodes in the second direction are separated by a second touch electrode; and/or in a same sensing region, an area of a first touch structure is equal to an area of a second touch structure.

15. The display panel according to claim 1, wherein the curved region includes a fifth-sub curved region and a sixth-sub curved region that are connected in sequence, and the fifth-sub curved region is located between the sixth-sub curved region and the planar region; the sixth-sub curved region includes a first boundary, and the curvature radius of the display substrate is the smallest at the first boundary; and in a direction perpendicular to the first boundary and from a boundary of the planar region to the first boundary, a curvature radius of the curved region decreases successively; bridge sub-regions of the plurality of bridge sub-regions are located in the planar region and/or the fifth sub-curved region.

16. The display panel according to claim 15, wherein a distance between a boundary of the fifth-sub curved region and the first boundary is greater than or equal to 0.3 mm; or the distance between the boundary of the fifth-sub curved region and the first boundary is greater than or equal to 0.3 mm, and in a direction parallel to the planar region of the display substrate and perpendicular to the first boundary, a ratio of a distance between the first boundary and a boundary of the display substrate to a width of the curved region is in a range of 0 to 0.5, inclusive.

17. The display panel according to claim 1, wherein the plurality of first touch electrodes of the first touch structure includes a plurality of first electrode patterns and a plurality of second electrode patterns, the plurality of first electrode patterns and the plurality of second electrode patterns are alternately arranged in the first direction, and a first electrode pattern is connected to a second electrode pattern through a first connection portion; and the second electrode pattern includes an electrode body and an electrode branch, and the electrode branch is disposed on opposite sides of the electrode body in the second direction and connected to the electrode body.

18. The display panel according to claim 17, wherein a region defined by boundaries of the first touch structures and the second touch structures is a touch region;

the display panel further comprises:

a first residual electrode pattern, wherein the first residual electrode pattern is a portion of a second electrode pattern of the first touch structure that still remains after an electrode branch and an electrode body of the second electrode pattern are cut off by a boundary of the touch region; and a third connection portion, wherein the first residual electrode pattern is connected to an electrode body or a first electrode pattern of a corresponding first touch structure through the third connection portion; and/or the display panel further comprises:

a second residual electrode pattern, wherein the second residual electrode pattern is a portion of the first touch structure that remains after being cut off by a boundary of the touch region; the second residual electrode pattern is connected to another adjacent first touch structure.

19. A display apparatus, comprising:

the display panel according to claim 1; and a circuit board connected to the display panel.

20. A display panel, comprising:

a display substrate having a light exit surface and a non-light exit surface, wherein a display region of the display substrate has a curved region;

a plurality of first touch structures disposed on the light exit surface of the display substrate and extending in a first direction, wherein a first touch structure includes a plurality of first touch electrodes and a plurality of first connection portions, the plurality of first touch electrodes are arranged in one or more columns, each column includes at least two first touch electrodes arranged at intervals in the first direction, and first touch electrodes in at least one column of the one or more columns are connected through first connection portions of the plurality of first connection portions; and a plurality of second touch structures disposed on the light exit surface of the display substrate and extending in a second direction, the second direction intersecting with the first direction; wherein a second touch structure includes a plurality of second touch electrodes and a plurality of second connection portions; the plurality of second touch electrodes are arranged in one or more rows, each row includes at least two second touch electrodes arranged at intervals in the second direction, and second touch electrodes in at least one row of the one or more rows are connected through second connection portions of the plurality of second connection portions; the plurality of first touch electrodes and the plurality of second touch electrodes are disposed in a same layer, and the plurality of first touch electrodes are disposed in a same layer as the plurality of first connection portions or the plurality of second connection portions;

wherein an overlapping region where an orthographic projection of a second connection portion of the plurality of second connection portions on the display substrate partially overlaps with an orthographic projection of a first connection portion of the plurality of first connection portions on the display substrate is a bridge sub-region; the plurality of first connection portions and the plurality of second connection portions define a plurality of bridge sub-regions, and at least one bridge sub-region of the plurality of bridge sub-regions is located in the curved region, and a curvature radius of the display substrate is greater than or equal to 4.5 mm in a bridge sub-region of the curved region;

wherein the display substrate includes a planar region and the curved region located on at least one side of the planar region;

the curved region includes a fifth-sub curved region and a sixth-sub curved region that are connected in sequence, and the fifth-sub curved region is located between the sixth-sub curved region and the planar region; the sixth-sub curved region includes a first boundary, and the curvature radius of the display substrate is the smallest at the first boundary; and in a direction perpendicular to the first boundary and from a boundary of the planar region to the first boundary, a curvature radius of the curved region decreases successively; bridge sub-regions of the plurality of bridge sub-regions are located in the planar region and/or the fifth sub-curved region.

\* \* \* \* \*